US011534270B2

(12) United States Patent
Rogers et al.

(10) Patent No.: US 11,534,270 B2
(45) Date of Patent: Dec. 27, 2022

(54) DENTAL IMPLANT ASSEMBLY HAVING SEALING FEATURES AT COMPONENT INTERFACES

(71) Applicant: BIOMET 3I, LLC, Palm Beach Gardens, FL (US)

(72) Inventors: Dan P Rogers, North Palm Beach, FL (US); Zachary B Suttin, West Palm Beach, FL (US)

(73) Assignee: BIOMET 3I, LLC, Palm Beach Gardens, FL (US)

( * ) Notice: Subject to any disclaimer, the term of this patent is extended or adjusted under 35 U.S.C. 154(b) by 0 days.

(21) Appl. No.: 15/211,288

(22) Filed: Jul. 15, 2016

(65) Prior Publication Data
US 2017/0014210 A1    Jan. 19, 2017

Related U.S. Application Data

(60) Provisional application No. 62/193,496, filed on Jul. 16, 2015.

(51) Int. Cl.
*A61C 8/00*    (2006.01)

(52) U.S. Cl.
CPC .......... *A61C 8/0059* (2013.01); *A61C 8/0012* (2013.01); *A61C 8/0013* (2013.01); *A61C 8/0065* (2013.01); *A61C 8/0068* (2013.01)

(58) Field of Classification Search
CPC .... A61C 8/0059; A61C 8/0065; A61C 8/0012
See application file for complete search history.

(56) References Cited

U.S. PATENT DOCUMENTS

| 3,182,702 | A | * | 5/1965 | Nason | F16B 39/34 411/304 |
| 4,746,293 | A | * | 5/1988 | Lundgren | A61C 8/005 433/169 |
| 5,336,090 | A | * | 8/1994 | Wilson, Jr. | A61C 8/008 433/172 |
| 5,482,463 | A | * | 1/1996 | Wilson, Jr. | A61C 8/005 433/173 |
| 5,695,335 | A | * | 12/1997 | Haas | A61C 8/0048 433/169 |
| 5,711,669 | A | * | 1/1998 | Hurson | A61C 8/0012 433/174 |

(Continued)

FOREIGN PATENT DOCUMENTS

| CN | 1298288 A | 6/2001 |
| CN | 102245122 A | 11/2011 |

(Continued)

OTHER PUBLICATIONS

"International Application Serial No. PCT/US2016/042480, International Search Report dated Jan. 2, 2017", 6 pgs.

(Continued)

*Primary Examiner* — Edward Moran
(74) *Attorney, Agent, or Firm* — Sheridan Ross P.C.

(57) ABSTRACT

A dental implant assembly is disclosed. The dental implant assembly includes an implant having a bore within a coronal end, an abutment configured to couple to the implant to the coronal end, a screw configured to secure the abutment to the implant, and a gasket configured to seal an interface between the implant and the abutment.

19 Claims, 15 Drawing Sheets

(56) References Cited

U.S. PATENT DOCUMENTS

| | | | | |
|---|---|---|---|---|
| 5,752,830 | A * | 5/1998 | Suarez | A61C 8/0022 433/169 |
| 5,779,481 | A * | 7/1998 | Aires | A61C 8/0006 433/172 |
| 6,315,563 | B1 * | 11/2001 | Sager | A61C 8/0057 433/173 |
| 6,447,295 | B1 * | 9/2002 | Kumar | A61C 8/0012 433/172 |
| 6,726,480 | B1 | 4/2004 | Sutter | |
| 8,888,486 | B2 * | 11/2014 | Goodman | A61C 8/0077 433/174 |
| 9,717,571 | B2 * | 8/2017 | Goodman | A61C 8/0063 |
| 2003/0224328 | A1 * | 12/2003 | Sapian | A61C 8/005 433/173 |
| 2007/0102888 | A1 * | 5/2007 | Takahiro | F16J 15/0887 277/603 |
| 2007/0202463 | A1 * | 8/2007 | Sanchez | A61C 8/0013 433/173 |
| 2007/0298377 | A1 * | 12/2007 | Kenealy | A61C 8/0012 433/173 |
| 2009/0123889 | A1 * | 5/2009 | Mehrhof | A61C 8/0066 433/173 |
| 2010/0082072 | A1 * | 4/2010 | Sybert | A61B 17/68 606/326 |
| 2010/0094376 | A1 * | 4/2010 | Penner | A61N 1/0517 607/42 |
| 2011/0244424 | A1 * | 10/2011 | Mehrhof | A61C 8/005 433/173 |
| 2012/0077150 | A1 * | 3/2012 | Goodman | A61C 8/006 433/173 |

FOREIGN PATENT DOCUMENTS

| | | |
|---|---|---|
| DE | 29606593.5 | 6/1996 |
| DE | 29606593 U1 | 6/1996 |
| DE | 19609174 A1 | 9/1996 |
| DE | 10215271 A1 | 10/2003 |
| DE | 202006010431 U1 | 2/2007 |
| DE | 102008058058 B3 | 7/2010 |
| EP | 1069868 B1 | 6/2006 |
| EP | 3322375 A1 | 5/2018 |
| FR | 2806291 | 9/2001 |
| JP | 2009507594 A | 2/2009 |
| WO | WO-2017011741 A1 | 1/2017 |

OTHER PUBLICATIONS

"International Application Serial No. PCT/US2016/042480, Invitation to Pay Add'l Fees and Partial Search Report dated Oct. 31, 2016", 6 pgs.

"International Application Serial No. PCT/US2016/042480, Written Opinion dated Jan. 2, 2017", 8 pgs.

"European Application Serial No. 16741815.1, Response filed Sep. 11, 2018 to Office Action dated Mar. 1, 2018", 12 pgs.

"Australian Application Serial No. 2016293577, First Examination Report dated Sep. 13, 2019", 3 pgs.

"Australian Application Serial No. 2016293577, Response filed First Examination Report dated Sep. 13, 2019", 23 pgs.

"Australian Application Serial No. 2016293577, Subsequent Examiners Report dated Feb. 20, 2020", 3 pgs.

"Chinese Application Serial No. 201680053578.0, Office Action dated Dec. 17, 2019", (W/English Translation), 14 pgs.

"Chinese Application Serial No. 201680053578.0, Response filed Apr. 30, 2020 to Office Action dated Dec. 17, 2019", (W/ English Translation of Claims), 12 pgs.

"European Application Serial No. 16741815.1, Communication Pursuant to Article 94(3) EPC dated Jun. 2, 2020", 8 pgs.

"Australian Application Serial No. 2016293577, Response filed Aug. 26, 2020 to Subsequent Examiners Report dated Feb. 20, 2020", 15 pgs.

"Australian Application Serial No. 2016293577, Subsequent Examiners Report dated Sep. 11, 2020", 9 pgs.

"Chinese Application Serial No. 201680053578.0, Office Action dated Jul. 16, 2020", (W/English translation), 15 pgs.

"Japanese Application Serial No. 2018-501902, Notification of Reasons for Refusal dated Aug. 25, 2020", (W/ English Translation), 6 pgs.

"Canadian Application Serial No. 2,992,743, Office Action dated Oct. 2, 2020", 5 pages.

"Chinese Application Serial No. 201680053578.0, Response filed Sep. 30, 2020 to Office Action dated Jul. 16, 2020", with English claims, 11 pages.

"European Application Serial No. 16741815.1, Resposne filed Dec. 14, 2020 to Communication Pursuant to Article 94(3) EPC dated Jun. 2, 2020", 16 pages.

"Canadian Application Serial No. 2,992,743, Response filed Feb. 1, 2021 to Office Action dated Oct. 2, 2020", 18 pgs.

"Japanese Application Serial No. 2018-501902, Response filed Feb. 24, 2021 to Notification of Reasons for Refusal dated Aug. 25, 2020", with English claims, 11 pages.

"Chinese Application Serial No. 201680053578.0, Response filed Mar. 9, 2021 to Office Action dated Jan. 18, 2021", with English claims, 7 pages.

"European Application Serial No. 16741815.1, Communication Pursuant to Article 94(3) EPC dated Mar. 15, 2021", 5 pgs.

"Canadian Application Serial No. 2,992,743, Office Action dated May 19, 2021", 5 pgs.

"European Application Serial No. 16741815.1, Response filed Jul. 26, 2021 to Communication Pursuant to Article 94(3) EPC dated Mar. 15, 2021", 12 pgs.

"Japanese Application Serial No. 2018-501902, Final Notification of Reasons for Refusal dated Jun. 8, 2021", w/ English Translation, 4 pgs.

"Japanese Application Serial No. 2018-501902, Response filed Sep. 7, 2021 to Final Notification of Reasons for Refusal dated Jun. 8, 2021", w/ English claims, 7 pgs.

"Canadian Application Serial No. 2,992,743, Response filed Sep. 17, 2021 to Office Action dated May 19, 2021", 18 pgs.

"Japanese Application Serial No. 2018-501902, Examiners Decision of Final Refusal dated Oct. 19, 2021", w/ English translation, 4 pgs.

* cited by examiner

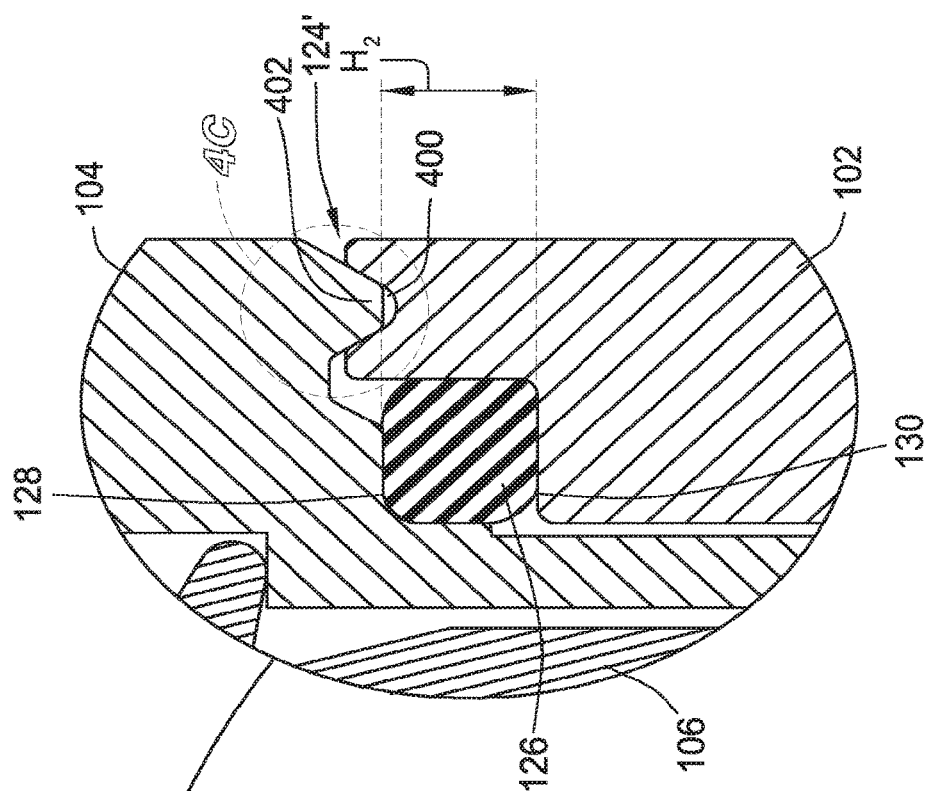
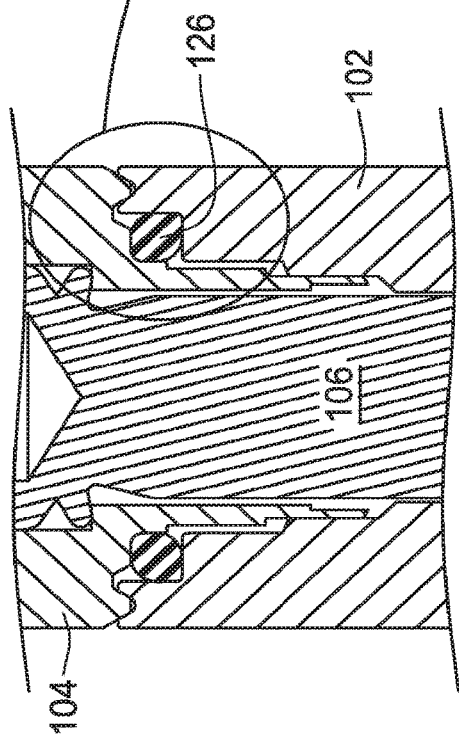
FIG. 4B
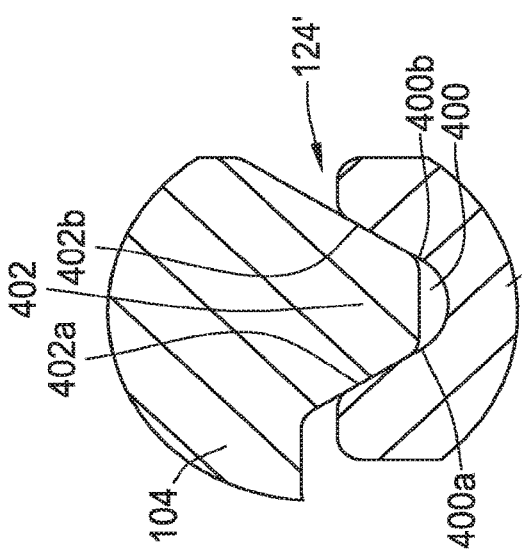
FIG. 4C

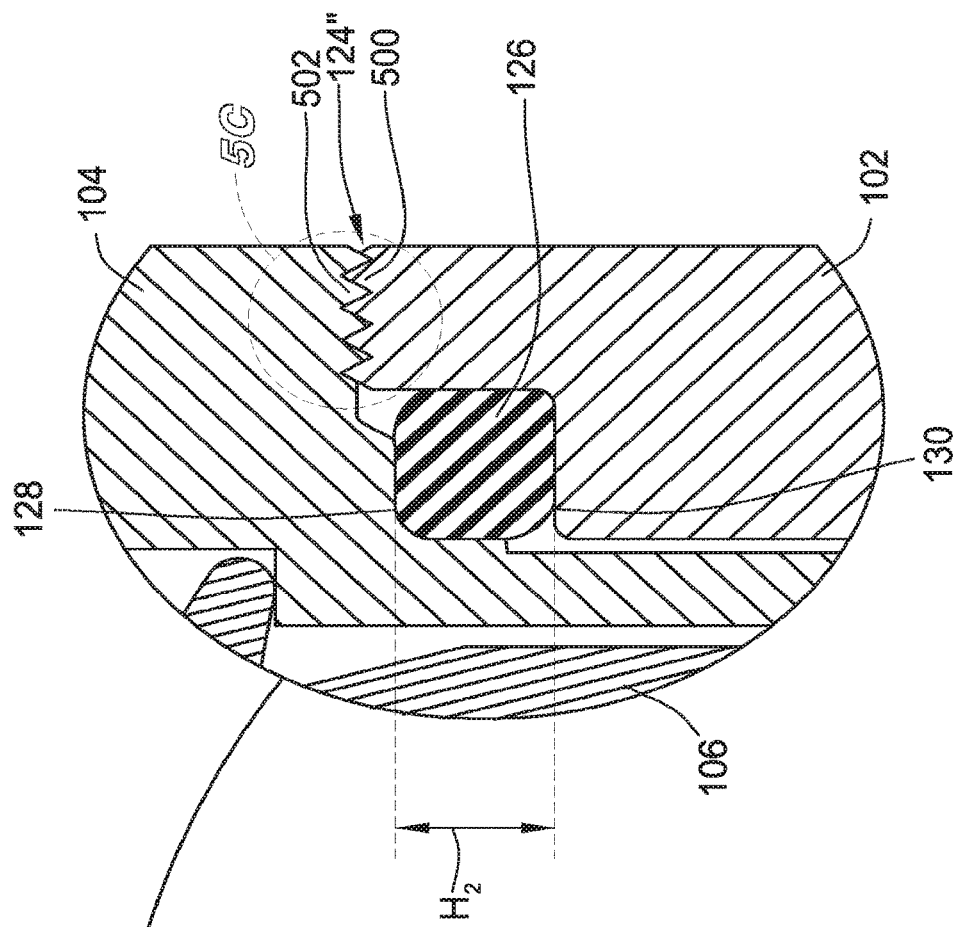
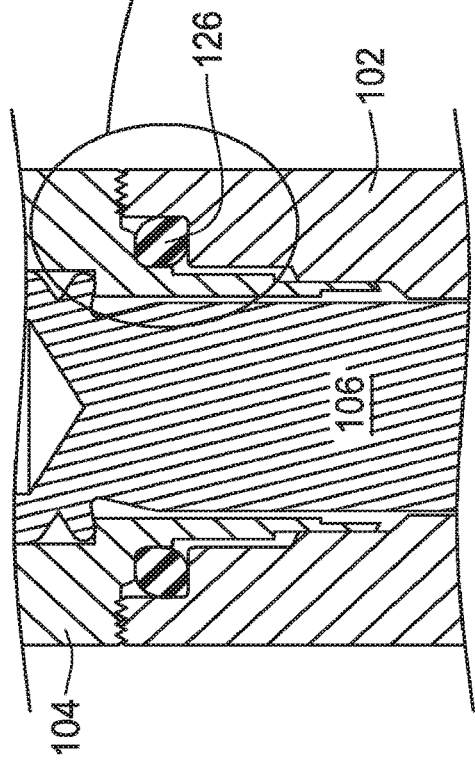
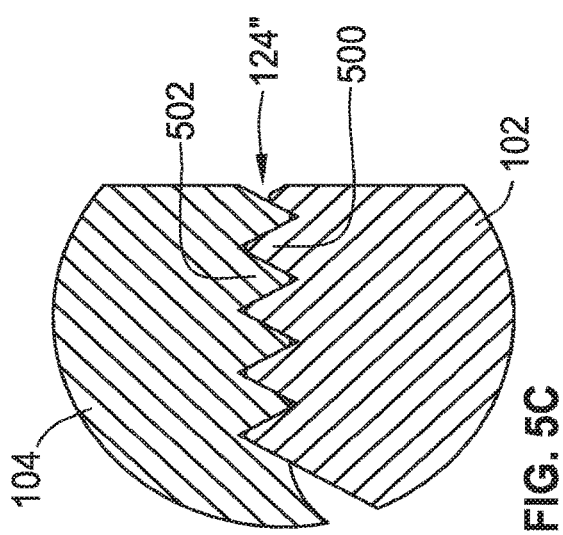
FIG. 5B
FIG. 5C

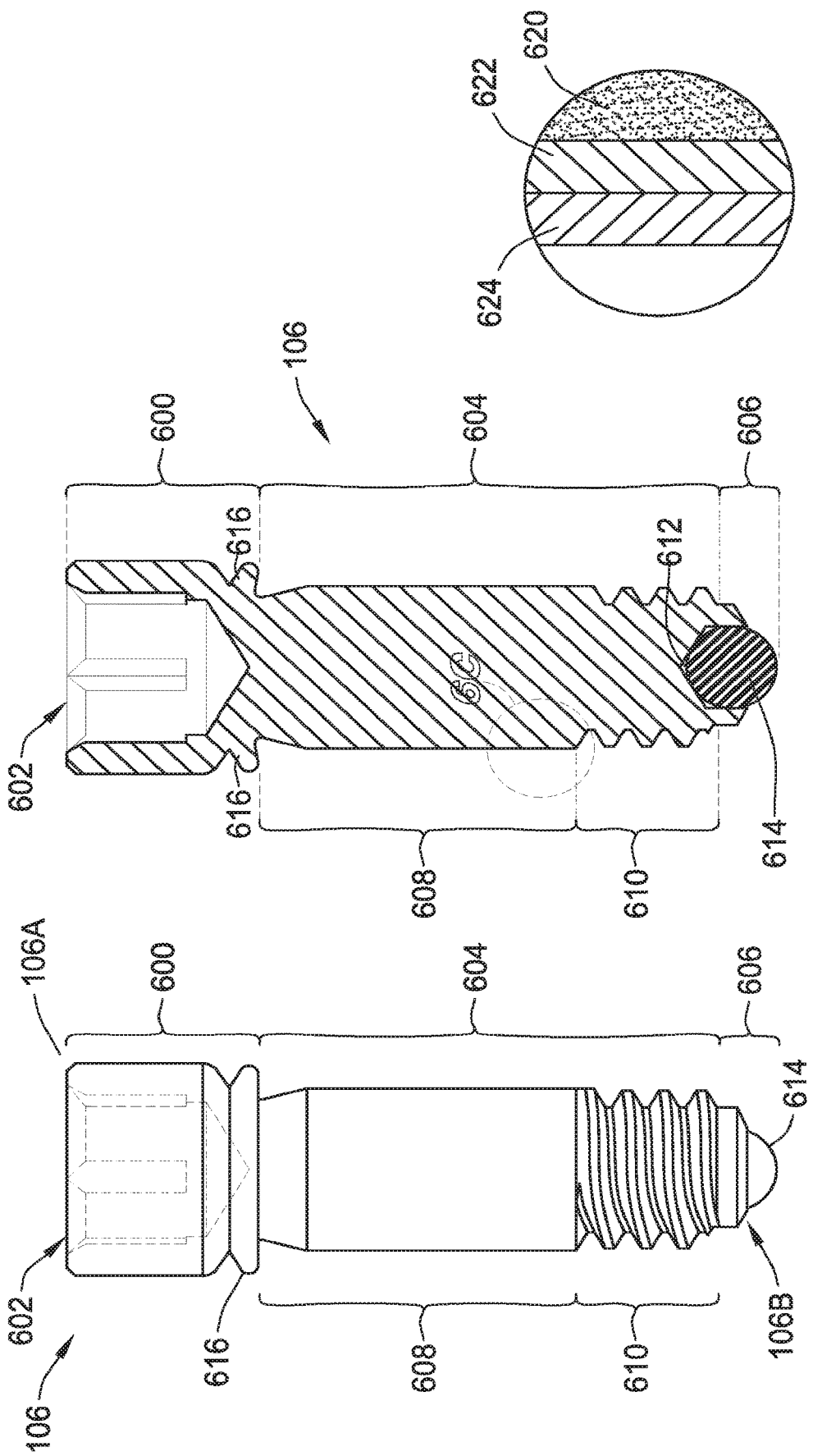

DENTAL IMPLANT ASSEMBLY HAVING SEALING FEATURES AT COMPONENT INTERFACES

CLAIM OF PRIORITY

This application claims the benefit of U.S. Provisional Patent Application Ser. No. 62/193,496, filed on Jul. 16, 2015, the benefit of priority of which is claimed hereby, and which is incorporated by reference herein in its entirety.

FIELD OF INVENTION

The present invention relates generally to a dental implant assembly. More particularly, the present invention relates to a dental mating system for use with an implant in a dental implant assembly.

BACKGROUND OF THE INVENTION

It is becoming more common to replace a missing tooth with a prosthetic tooth that is placed upon and attached to an implant. Often, the prosthetic tooth is placed upon or over a mating component (e.g., an abutment), which is attached to an implant of a dental implant assembly. The implant serves as the artificial root that integrates with the bone tissue of the mouth. The prosthetic tooth preferably has a size and a color that mimics the missing natural tooth. Consequently, the patient has an aesthetically pleasing and structurally sound artificial tooth.

Several surgical protocols exist by which implants are integrated into the patient. By way of example, and without limitation, one current surgical protocol involves two stages. In the first stage, the implant is inserted into the jawbone, covered by suturing the overlying gingival tissue, and allowed to osseointegrate for a period of two to four months. Covering the implant with the overlying gingival tissue minimizes the likelihood of infection around the implant and is intended to guard against disturbances that may negatively affect the process of osseointegration. The implants used in the two-stage protocol are sometimes referred to as "subgingival implants."

After osseointegration is complete, the second stage is encountered in which the gingival tissue is again cut open and a gingival healing abutment is placed onto the implant. The overlying gingival tissue is sutured to allow it to properly heal around the healing abutment. When the healing abutment is removed and the prosthetic tooth is placed on the implant, the gingival tissue conforms around the prosthetic tooth.

Another implant surgical protocol requires one stage and can use a subgingival implant or another type of implant called a "transgingival implant," which is intended to receive some degree of loading during osseointegration and also guides the healing of the gingival tissue. This is accomplished by providing a dental implant that has a portion that integrates with the jawbone and a mating component that extends through the overlying gingival tissue so that the tissue properly heals therearound.

In both protocols, the mating components used generally have an internal bore through which a screw is inserted. The screw inserted through the mating component engages a threaded bore in the implant to secure the mating component to the dental implant. The screw may be pretensioned to prevent or minimize the separation between the individual components of a dental implant assembly; such as, for example, separation between the mating component and the implant. As the screw is fully threaded into the bore in the dental implant, the screw is tensioned between the engaging threaded surfaces of the screw and the bore, and the abutting surfaces of the screw and a seating surface around of the mating component. After the screw head seats on the seating surface, the tension on the screw increases as the screw is threaded farther into the bore. This tension on the screw produces a force that is commonly referred to as the "preload" of the screw. Preload may be described as the clamping force. By reducing the friction between the rotating surfaces of the screw and the opposed surfaces, the preload on the screw can be increased for any applied torque because that torque will cause the screw to be advanced farther into its bore as a direct result of the reduced friction.

While it is desirable that a generally sealed, leak-proof interface exists between the implant and the mating component, as well as the screw and the implant and the screw and the mating component, the interface can have a small gap (herein referred to as a "microgap"), which may open slightly over time. The microgap typically occurs at the interface between the opposed surfaces of the implant and the mating component. Oral fluids, microorganisms, combinations thereof, or the like may gain access to the interior of the dental implant assembly by passing through the microgap. Capillary action may play a part in the passage of these fluids through the microgap. The fluids, microorganisms, combinations thereof, or the like may contain bacteria and/or nutrients required for bacterial growth, thus promoting the growth and/or spread of bacteria within and around the microgap. As one side effect, the bacterial activity may result in the breakdown of proteins and the production of foul smelling compounds, thereby causing malodor. Furthermore, the presence of bacteria in and/or around the microgap may cause or contribute to infection and/or inflammation of the gingival tissue surrounding the implant.

Aspects of the present disclosure are directed to an improved dental implant assembly that assists in addressing one or more of the above disadvantages.

SUMMARY OF THE INVENTION

In one aspect, a dental implant assembly is described. The dental implant assembly includes an implant, an abutment, a screw, and a gasket. The implant includes a bore within a coronal end of the implant. The abutment is configured to couple to the implant at the coronal end. The screw is configured to secure the abutment to the implant. The gasket is configured to seal an interface between the implant and the abutment.

In another aspect, a dental mating system configured to use with an implant, includes a bore that extends apically into a coronal end of the implant, is described. The dental mating system includes a mating component and a gasket. The mating component includes an insert portion and a mating component groove. The insert portion is configured to be inserted at least partially within the bore. The gasket is configured to sit within the mating component groove and seal an interface between the mating component and the implant.

In a further aspect, a screw configured to retain a mating component against an implant in a dental implant assembly is described. The screw includes a head, a shaft, and a tip. The head is configured to accept a tool to apply torque to the screw. The shaft is coupled to and extends from the head. The shaft includes threads that engage threads of a bore within the implant. The tip is at an apical end of the shaft and is configured to deform in response to a threshold torque applied to the screw to secure the mating component to the implant.

In an additional aspect, a method of coupling at least two mating components to an implant of an implant assembly is described. The method includes coupling a first mating component to the implant. Coupling the first mating component causes a gasket between the first mating component and the implant to deform a first deformation amount. The gasket deforming the first deformation amount seals a first interface between the first mating component and the implant. The method further includes removing the first mating component from the implant. The method further includes coupling a second mating component of the at least two mating components to the implant. Coupling the second mating component causes the gasket between the second mating component and the implant to deform further a second deformation amount. The gasket deforming the second deformation amount seals a second interface between the second mating component and the implant.

In a further aspect, a dental implant assembly, including an implant, a mating component, and a screw, is described. The dental implant assembly includes a first, a second, and a third interface. The first interface is between the implant and the mating component. The second interface is between the screw and the mating component. The third interface is between the screw and the implant. At least one of two surfaces defining the first interface, the second interface, or the third interface includes a deformable material to seal a volume between the two surfaces.

BRIEF DESCRIPTION OF THE DRAWINGS

FIG. 4B shows the alternative interface between the implant and the mating component of FIG. 4A, post-deformation of the gasket, in accord with aspects of the present disclosure;

FIG. 4C shows a detailed view of the interface between the implant and the mating component of FIGS. 4A and 4B, in accord with aspects of the present disclosure;

FIG. 5B shows the other alternative interface between the implant and the mating component of FIG. 5A, post-deformation of the gasket, in accord with aspects of the present disclosure;

FIG. 5C shows a detailed view of the interface between the implant and the mating component of FIGS. 5A and 5B, in accord with aspects of the present disclosure;

FIG. 6A shows a perspective view of the screw of FIGS. 1A and 1B, in accord with aspects of the present disclosure;

FIG. 6B shows a cross-sectional view of the screw of FIG. 6A, in accord with aspects of the present disclosure;

FIG. 6C shows a detailed cross-sectional view of the screw of FIGS. 6A and 6B, in accord with aspects of the present disclosure;

Figure 1A:
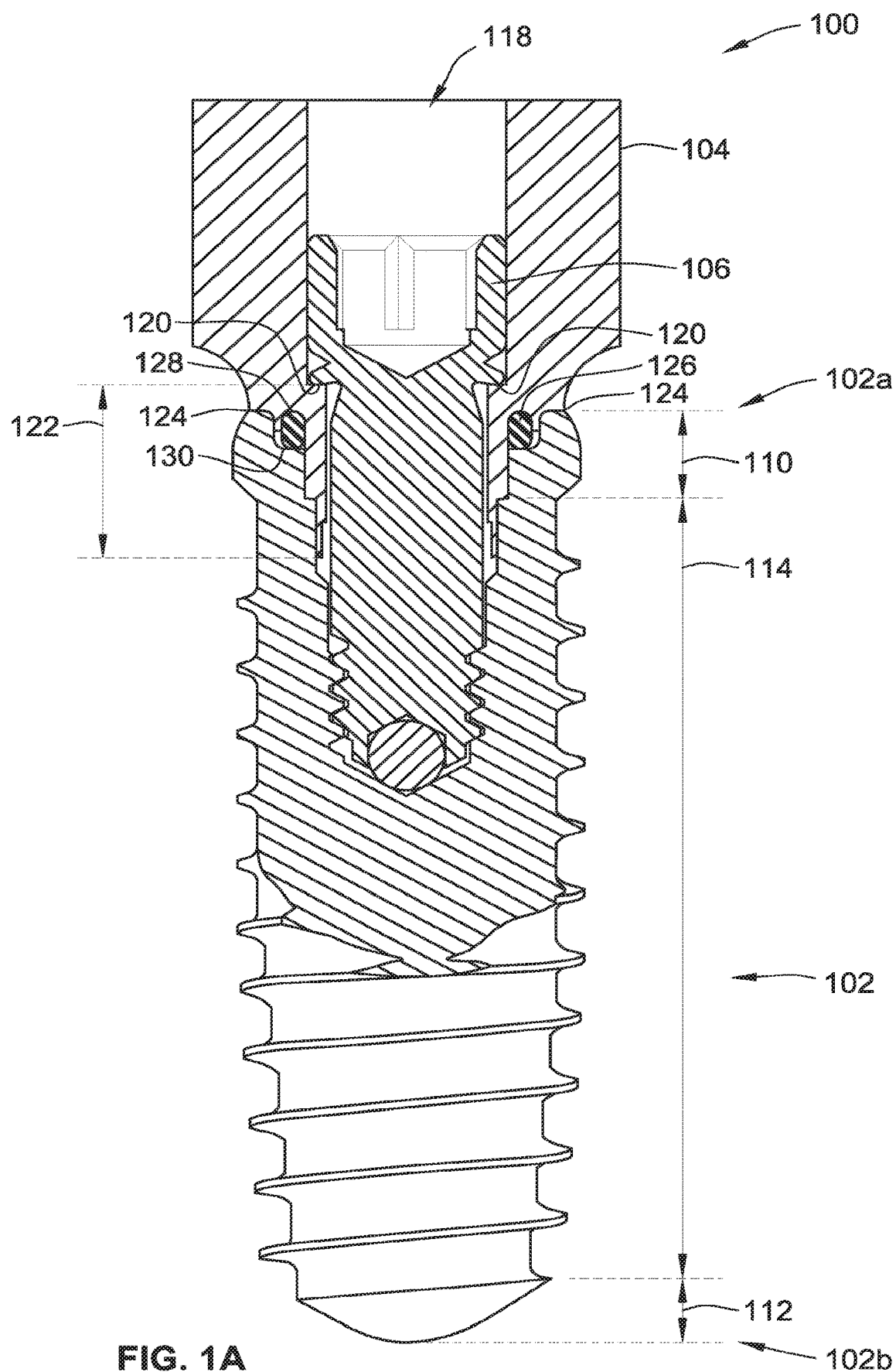
FIG. 1A shows an assembled view of a dental implant assembly including an implant, a mating component, a screw, and a gasket, in accord with aspects of the present disclosure.

While the invention is susceptible to various modifications and alternative forms, specific embodiments thereof have been shown by way of example in the drawings and will herein be described in detail. It should be understood, however, that it is not intended to limit the invention to the particular forms disclosed but, on the contrary, the intention is to cover all modifications, equivalents, and alternatives falling within the spirit and scope of the invention as defined by the appended claims.

DESCRIPTION OF ILLUSTRATIVE EMBODIMENTS

Figure 1B:
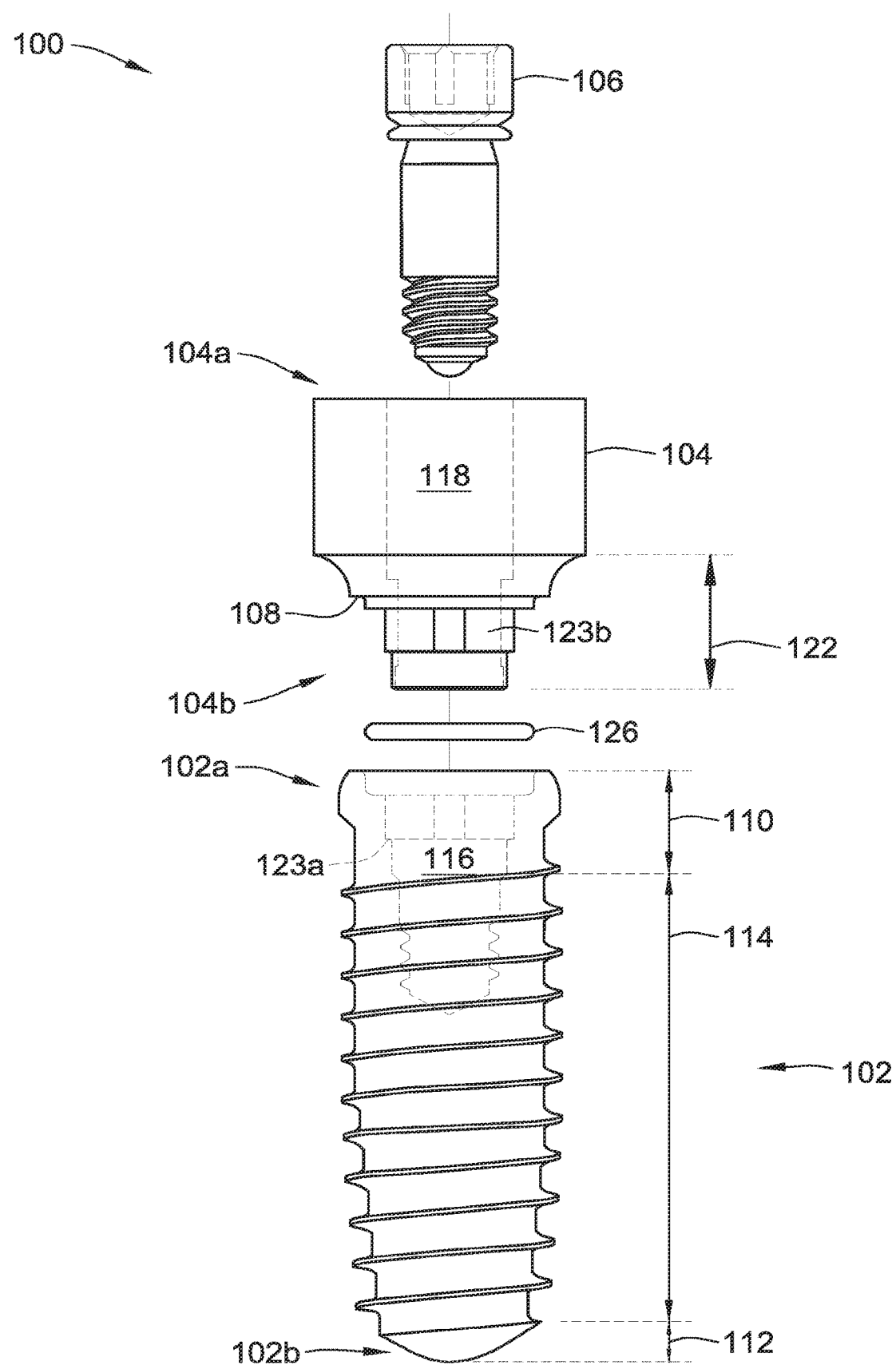
FIG. 1B shows an exploded view of the dental implant assembly of FIG. 1A, in accord with aspects of the present disclosure.

Referring to FIGS. 1A and 1B, a dental implant assembly 100 is illustrated. FIG. 1A is an assembled view of the dental implant assembly 100, and FIG. 1B is an exploded view of the dental implant assembly 100. The dental implant assembly 100 includes an implant 102, a mating component 104 (e.g., an abutment), and a screw 106. The implant 102 generally includes a head portion 110 at a coronal end 102a, a tip 112 at an apical end 102b, and a threaded portion 114 therebetween. The implant 102 also includes a bore 116. The bore 116 extends into the coronal end 102a of the implant 102. The bore 116 is at least partially threaded to engage threads on the screw 106 (discussed in detail below). The implant 102 can be formed of various metals, alloys, and/or ceramics that promote or allow for osseointegration. By way of example, and without limitation, such materials include titanium, tantalum, cobalt, chromium, stainless steel, or alloys thereof. It is contemplated that other materials including, but not limited to, ceramic-titanium combinations may also form the implant 102.

The mating component 104 includes a seating surface 108 that engages the coronal end 102a of the dental implant 102 when the mating component 104 is coupled to the implant 102. The mating component 104 also has generally a tubular shape due to an internal bore 118 that extends entirely through the mating component 104, from a coronal end 104a to an apical end 104b. The internal bore 118 includes a shoulder 120 that extends around a surface of the internal bore 118 and upon which the screw 106 sits in the assembled dental implant assembly 100. The mating component 104 may include an insert portion 122 that is inserted within the bore 116 of the implant 102. Alternatively, the mating component 104 may exclude the insert portion 122 and, instead, may include a recess (not shown) that couples over at least part of the coronal end 102a of the implant 102.

The mating component 104 can be various components within a dental implant assembly 100 that serve a specific role in the process of replacing a tooth. By way of example, the mating component 104 can be a healing abutment, a temporary abutment, and/or a permanent abutment. The mating component 104 can be other components not mentioned herein that couple to the implant 102, without departing from the spirit and scope of the present disclosure.

The mating component 104 can be formed of a biocompatible material having sufficient properties to, for example, support a prosthesis. By way of example, mating component 104 can be formed of metal, such as titanium, titanium alloy, stainless steel, cobalt chromium alloys, and gold alloys. Additionally, the mating component 104 can be made of a ceramic material, such as alumina or zirconium, which, unlike the darker shaded metals, has a lighter coloring and may provide better aesthetics. The mating component 104 can also be made of a polymeric material, such as an organic thermoplastic polymer, such as polyether ether ketone (PEEK), which may be especially useful for temporary abutments.

The implant 102 and the mating component 104 can include various arrangements for non-rotational engagement. Although the illustrated embodiment includes an internal anti-rotational connection feature, the implant 102 can include an external feature for non-rotationally engaging a correspondingly shaped, internal feature on the mating component 104. Engagement between an external feature of the implant 102 and an internal feature of the mating component 104 can be referred to as an external connection between the implant 102 and the mating component 104. By way of example, the implant 102 can include a boss (not shown) as the non-rotational feature, and the mating component 104 can include a socket (not shown) as the correspondingly shaped, internal feature. The boss and the socket may, for example, be polygonal, such as hexagonal. The non-rotational features may also be other suitable non-round shapes to prevent, for example, the mating component 104 from rotating relative to the implant 102 upon coupling the mating component 104 to the implant 102.

With regard to the illustrated embodiment of FIGS. 1A and 1B, the implant 102 includes an internal feature 123a located on the insert portion 122 for non-rotationally engaging a correspondingly shaped anti-rotational feature 123b located on the insert portion 122 on the mating component 104. An internal feature of the implant 102 and an external feature of the mating component 104 can be referred to as an internal connection between the implant 102 and the mating component 104. By way of example, the mating component 104 can include a polygonal boss as the non-rotational feature and the implant 102 can include a socket as the correspondingly shaped, internal feature for receiving the polygonal boss. Similar to above, the boss and the socket may be polygonal, such as hexagonal, or other suitable, non-round shapes. However, it is contemplated that other types of implants and implant assemblies not shown in the illustrated embodiments may also be used with the present invention.

The mating component 104 is secured to the implant 102 using the screw 106 that extends through an internal bore 118 of the mating component 104 and into the bore 116 of the implant 102. The screw 106 secures the mating component 104 to the implant 102 at an interface 124 defined by an engagement between the coronal end 102a of the implant 102 and the apical end 104b of the mating component 104.

Despite the screw 106 securing the mating component 104 to the implant 102 at the interface 124, the interface 124 can define a microgap. Specifically, and by way of example, when an artificial tooth (not shown) of the dental implant assembly 100 is used to chew food (mastication), the dental implant assembly 100 is subjected to significant forces that place loads on the mating component 104 and the implant 102. These forces may cause an intermittent microgap to occur located at the interface 124 of the mating component 104 and the implant 102. The microgap may allow oral fluids and/or microorganisms containing bacteria to seep through interior apertures in the dental implant assembly 100.

Accordingly, the dental implant assembly 100 further includes a gasket 126. The gasket 126 is located at the interface 124 between the implant 102 and the mating component 104. Specifically, the gasket 126 is located between the seating surface 108 and the coronal end 102a of the implant. The gasket 126 can be affixed to or integral with the mating component 104. Alternatively, the gasket 126 can be a separate from the mating component 104. The gasket 126 seals the interface 124 between the implant 102 and the mating component 104 to obstruct or prevent fluids and/or microorganisms from passing into interior apertures of the dental implant assembly 100.

To seal the interface 124, the gasket 126 is configured to deform under the clamping force generated by coupling the mating component 104 to the implant 102 using the screw 106. When a user (e.g., periodontist, clinician, etc.) couples the mating component 104 to the implant 102, the user rotates the screw 106 by applying a rotational force (e.g., torque) to the screw 106. Threads of the screw 106 engaging with the threads of the bore 116 of the implant 102 convert the rotational force to a linear-downward force. The linear-downward force causes the screw 106 to translate farther into the bore 116 until the screw 106 engages a surface of the implant 102 (e.g., bore 116), the mating component 104 (e.g., shoulder 120), or both, that obstructs or provides resistance to the screw 106 from continuing to translate farther into the bore 116.

The configuration (e.g., shape, dimensions, etc.) of the implant 102, the mating component 104, the screw 106, and the gasket 126 is such that a compressive force is applied to the gasket 126 prior to the implant 102 or the mating component 104 obstructing the screw 106 from translating farther into the bore 116. Accordingly, additional rotational force on the screw 106 is converted into a linear-downward force and compressive force on the gasket 126. The compressive force causes the gasket 126 to deform. The deformation causes the gasket 126 to exert a spring-type force on the screw 106. This spring-type force on the screw 106 increases the preload of the screw 106. Additionally, the deformation causes the gasket 126 to fill voids and/or interior apertures between the gasket 126 and the implant 102 and/or the mating component 104. The deformation may also cause the gasket 126 to expand inwardly and/or outwardly relative to the central axis of the dental implant assembly 100 to further fill voids and/or interior apertures between the gasket 126 and the implant 102 and/or the mating component 104.

The gasket 126 is generally the shape of the interface 124 between the implant 102 and the mating component 104 corresponding to the location of the gasket 126 relative to the implant 102 and the mating component 104. To help seal the interface 124 and resist or prevent interior volumes of the dental implant assembly 100, such as the implant 102, from being exposed to fluid and/or microorganisms, the gasket 126 surrounds the opening of the bore 116 of the implant 102. Accordingly, the gasket 126 can be formed in the shape of a ring to correspond with the generally circular shape of the opening of the bore 116. However, the overall shape of the gasket 126 can be various other shapes, such as an oval, an ellipse, a square, etc., without departing from the spirit and scope of the present disclosure.

The vertical cross-section of the gasket 126 prior to deformation is generally in the shape of a circle. However, the shape of the cross-section can vary without departing from the spirit and scope of the present disclosure. By way of example, and without limitation, the shape of the cross-section can be a circle, a square, a rectangle, an oval, a triangle, a hexagon, etc. The gasket 126 can be in a specific shape (overall shape and/or cross-sectional shape) based on the corresponding shapes of the implant 102 and the mating component 104 that engage the gasket 126. Alternatively, the gasket 126 can be in any one of the above-described shapes regardless of the shape of the implant 102 and/or the mating component 104.

The gasket 126 is formed of a material that deforms under the compressive loads associated with securing the mating component 104 to the implant 102, and prior to the material(s) used to form the mating component 104 and the implant 102 deforming. By way of example, the gasket 126 can be formed of silver or a silver alloy. The hardness of a silver or a silver alloy gasket 126 can be less than the hardness of the materials used to form the implant 102 and the mating component 104 such that the implant 102 and the mating component 104 maintain their shape under the compressive loads that deform the gasket 126.

The gasket 126 formed of silver or a silver alloy also exhibits antimicrobial properties based on the antimicrobial properties associated with silver. By way of example, silver and silver alloys produce silver ions upon contact with water naturally present in the environment of the mouth. Silver ions exhibit antimicrobial qualities that resist or prevent microbial promoting conditions within the dental implant assembly 100. That is, ionic silver is highly antimicrobial and, therefore, has an ability to attack and destroy bacteria and/or microbes. Ionic silver is also antimicrobial in extremely low doses (e.g., 0.001 ppm) and is nontoxic to human cells at these low doses. Thus, in addition to the gasket 126 mechanically sealing interfaces within the dental implant assembly 100, which prohibits or prevents the spread of microbial containing and/or promoting fluid and/or food, the gasket 126 also chemically prohibits or prevents the spread and/or production of microbes based on the antimicrobial properties of silver.

The gasket 126 may fit between the implant 102 and the mating component 104, specifically the seating surface 108 of the mating component 104, without varying the original shape and/or configuration of one or both of the implant 102 and the mating component 104. Thus, the gasket 126 can be used with currently existing implants 102 and/or mating components 104. Alternatively, one or both of the implant 102 and the mating component 104 can include a feature within which the gasket 126 sits at the interface 124 between the implant 102 and the mating component 104.

As shown in FIGS. 1A and 1B, the implant 102 can include a groove 130 at the coronal end 102a. Alternatively, or in addition, the seating surface 108 of the mating component 104 can include a groove 128. The gasket 126 can sit within one or both of the grooves 128 and 130, depending on which are present, to mechanically support the seal at the interface 124 between the implant 102 and the mating component 104.

Figure 2A:
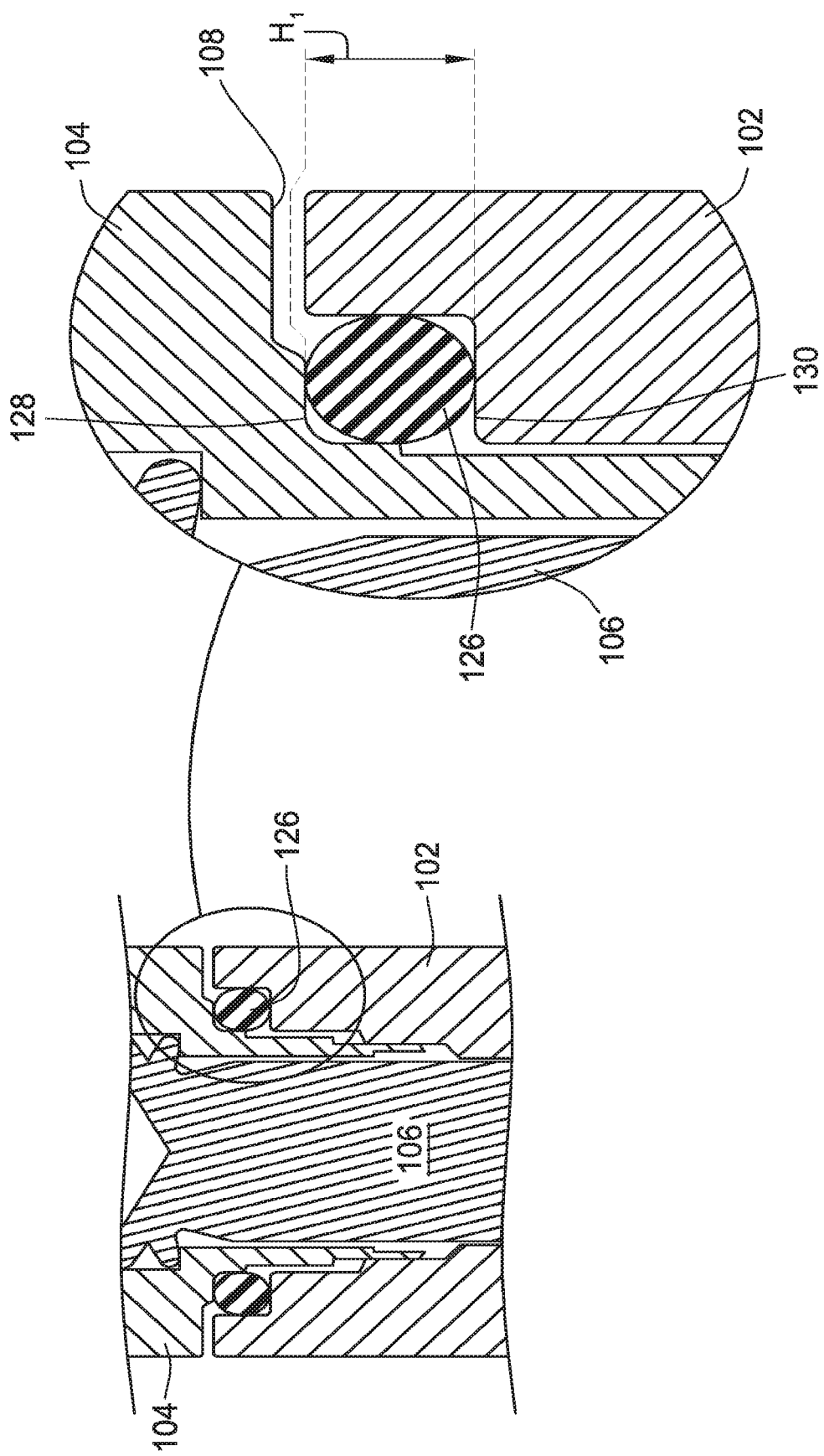
FIG. 2A shows pre-deformation of the gasket of FIGS. 1A and 1B at an interface between the implant and the mating component, in accord with aspects of the present disclosure.
Figure 2B:
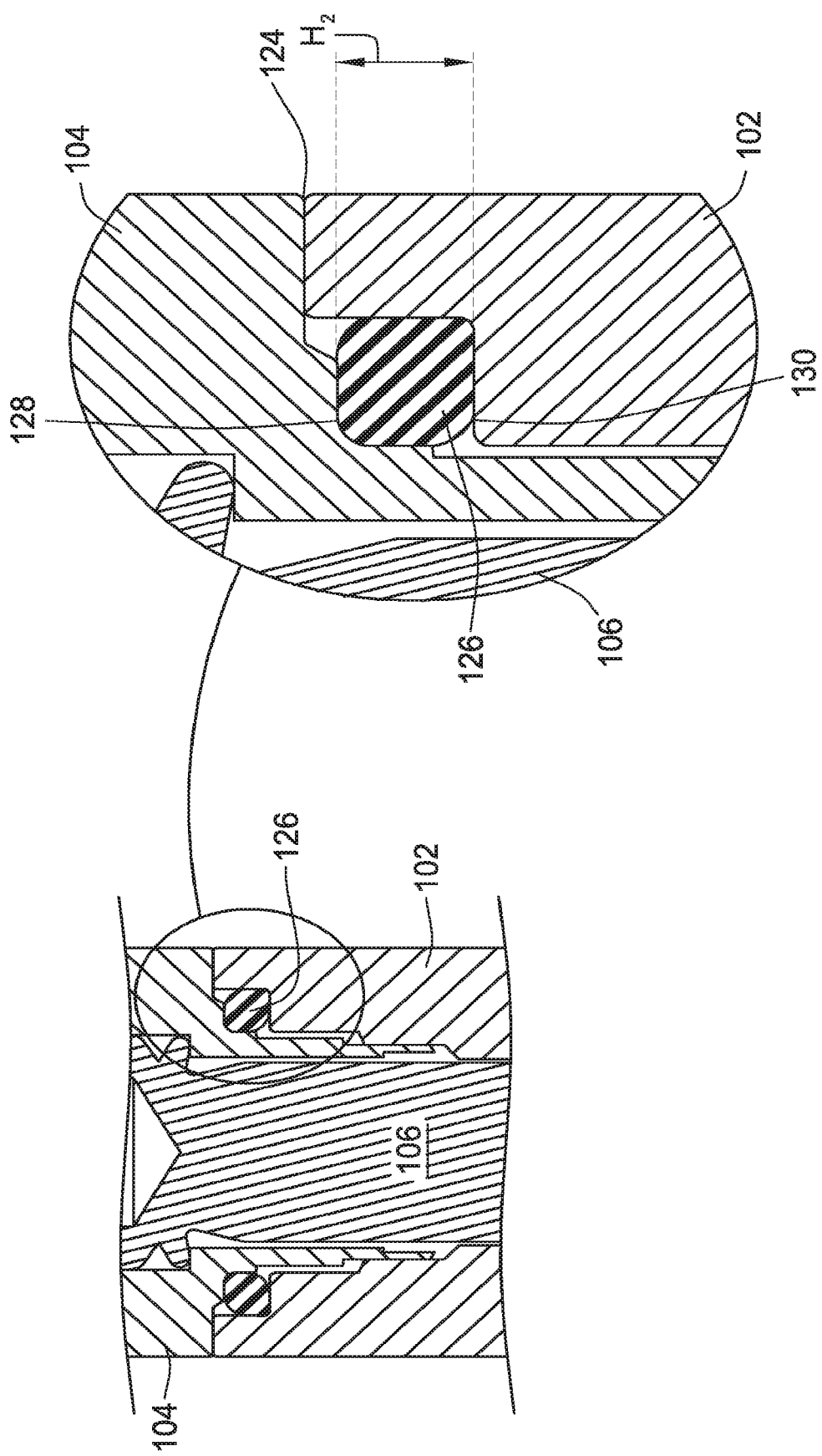
FIG. 2B shows post-deformation of the gasket of FIGS. 1A and 1B at an interface between the implant and the mating component, in accord with aspects of the present disclosure.

FIGS. 2A and 2B show pre- and post-deformation of the gasket of FIGS. 1A and 1B at the interface 124 between the implant 102 and the mating component 104, in accord with aspects of the present disclosure. As shown, the gasket 126 initially has a height $H_1$, which can be, for example, 0.25 mm to 1 mm depending on the size of the dental implant assembly 100. With the mating component 104 coupled to the implant 102, the groove 128 and the groove 130 defines a cross-section with a height $H_2$, which is less than the height $H_1$ of the gasket 126. Accordingly, FIG. 2A shows the initial contact between the mating component 104 and the gasket 126 upon the mating component 104 being connected to the implant 102 with the screw 106. Upon the screw 106 being further rotated, the linear-downward force imparted within the dental implant assembly 100 by rotating the screw 106 compresses the gasket 126 between the grooves 128 and 130 until the mating component 104 is coupled to the implant 102, defining the interface 124, as shown in FIG. 2B. Based on the difference in the heights $H_1$ and $H_2$, the gasket 126 is compressed to the height $H_2$. The deformation of the gasket 126 seals apertures within the interface 124 that may still exist between the implant 102 and the mating component 104.

Figure 3A:
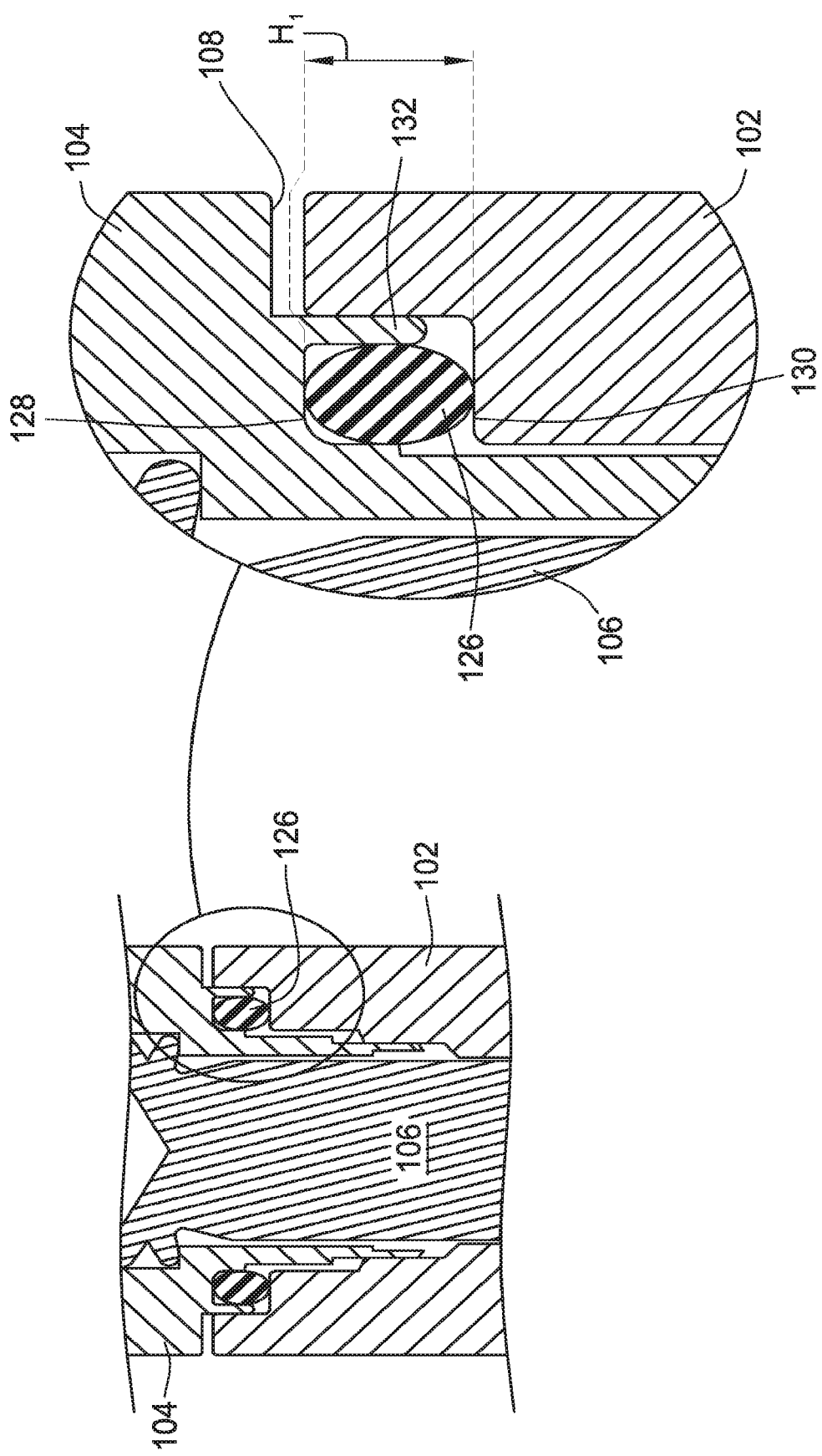
FIG. 3A shows a variation of a groove of the mating component of FIGS. 1A and 1B, pre-deformation of the gasket, in accord with aspects of the present disclosure.
Figure 3B:
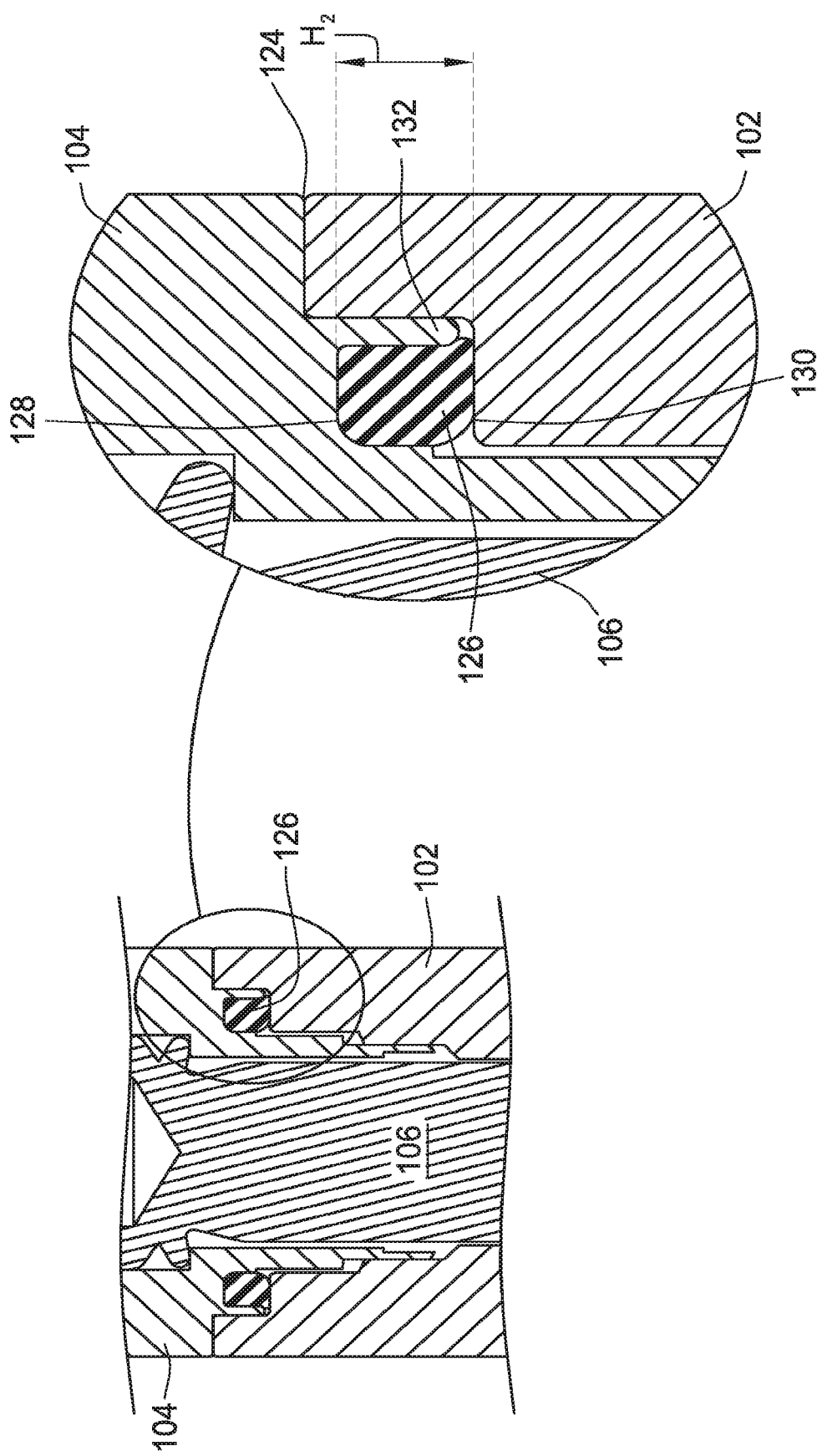
FIG. 3B shows the variation of the groove of the mating component of FIG. 3A, post-deformation of the gasket, in accord with aspects of the present disclosure.

FIGS. 3A and 3B show a variation of the groove 128 of the mating component 104 of FIGS. 1A and 1B, in addition to pre- and post-deformation of the gasket 126, in accord with aspects of the present disclosure. The groove 128 of the mating component 104 can be defined at least in part by a lip 132 that forms the outer surface of the groove 128. The lip 132 is arranged (e.g., based on size and alignment) to sit within the groove 130 of the implant 102 with the mating component 104 coupled to the implant 102. The presence of the lip 132 within the groove 128 further obstructs and/or prevents fluid and microorganisms from entering interior apertures between the implant 102 and the mating component 104. The lip 132 acts in combination with the gasket 126 to seal the interface 124 between the implant 102 and the mating component 104.

As shown and discussed above, the gasket 126 initially has a height $H_1$, which can have the dimensions discussed above, such as 0.5 mm. The combination of the groove 128 and the groove 130 defines a cross-section with a height $H_2$ that is less than the height $H_1$ of the gasket 126. Accordingly, FIG. 3A shows the initial contact between the mating component 104 and the gasket 126, with the lip 132 contacting an outer surface of the gasket 126 and an inner surface of the groove 130, upon the mating component 104 being connected to the implant 102 with the screw 106. Upon the screw 106 being further rotated, the linear-downward force imparted within the dental implant assembly 100 through the screw 106 compresses the gasket 126 between the grooves 128 and 130 until the mating component 104 is coupled to the implant 102, defining the interface 124, as shown in FIG. 3B. As discussed above, based on the difference in the heights $H_1$ and $H_2$, the gasket 126 is deformed to the height $H_2$. Deformation of the gasket 126 seals apertures that may still exist between the implant 102 and the mating component 104 upon the implant 102 and the mating component 104 coupling at the interface 124. The addition of the lip 132 engaged with the deformed gasket 126 further obstructs fluid and/or microorganisms from passing through apertures by, for example, making a more tortuous path for the fluid and/or microorganisms.

Figure 4A:
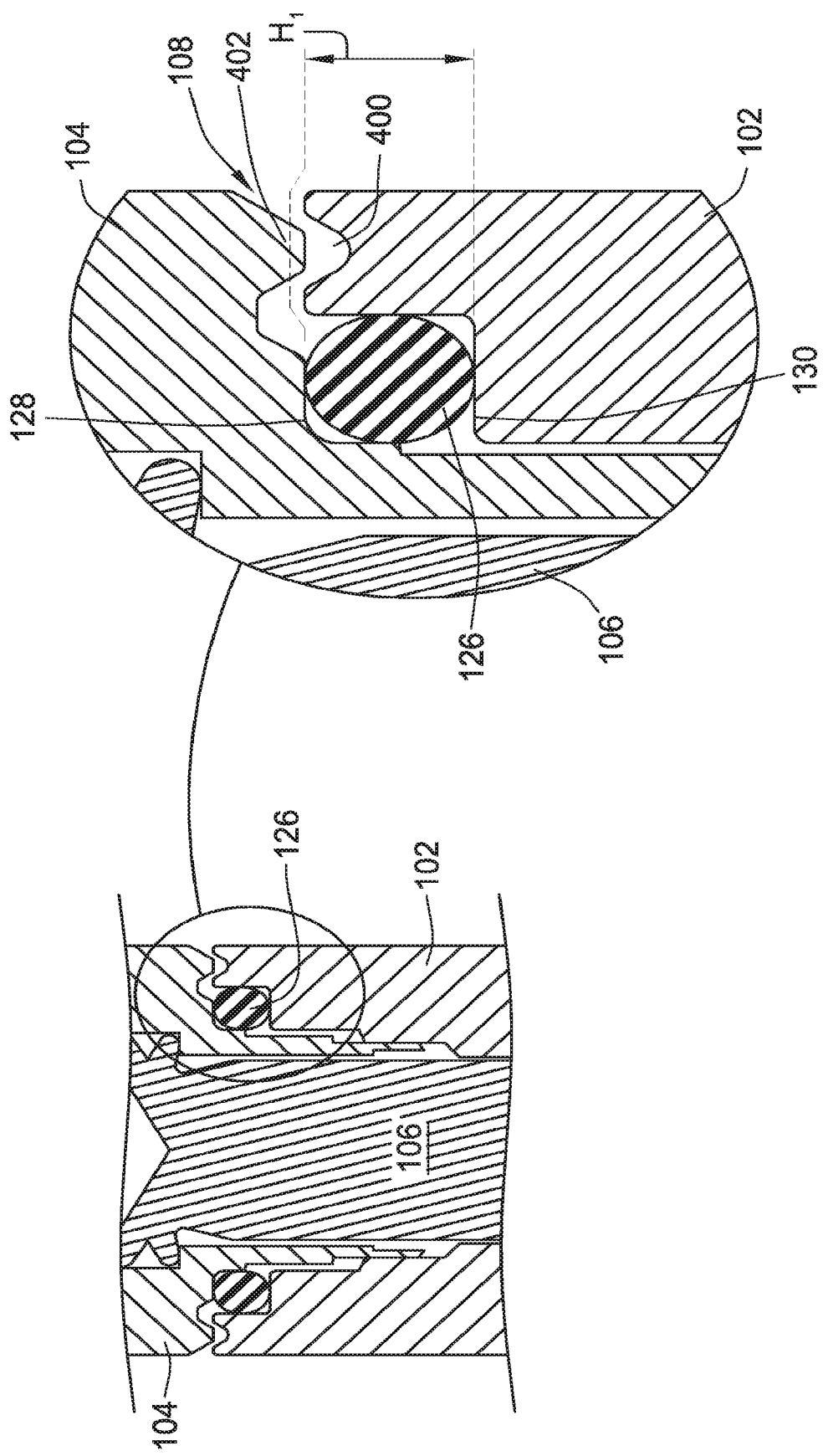
FIG. 4A shows an alternative interface between the implant and the mating component of FIGS. 1A and 1B, pre-deformation of the gasket, in accord with aspects of the present disclosure.

FIGS. 4A and 4B show a variation of the interface 124' between the implant 102 and the mating component 104 of FIGS. 1A and 1B, in addition to pre- and post-deformation of the gasket 126, in accord with aspects of the present disclosure. The implant 102 can include a coronal groove 400 at the coronal end 102a. Further, the mating component 104 can include a coronal ridge 402 on the seating surface 108. Alternatively, the implant 102 can include the coronal ridge 402 and the seating surface 108 of the mating component 104 can include the coronal groove 400. The coronal groove 400 and the coronal ridge 402 provide a lateralized connection between the implant 102 and the mating component 104. The lateralized connection provides increased stabilization between the implant 102 and the mating component 104 in contrast to a non-lateralized (e.g., flat) interface between the implant 102 and the mating component 104. Particularly, the lateralized connection provides increases stabilization against shear forces at the interface 124'.

As discussed above, the gasket 126 initially has a height $H_1$, which can be, for example, 0.25 mm to 1 mm, depending on the size of the dental implant assembly 100. The combination of the groove 128 and the groove 130 defines a cross-section with a height $H_2$ that is less than the height $H_1$ of the gasket 126. FIG. 4A shows the initial contact between the mating component 104 and the gasket 126 upon the mating component 104 being connected to the implant 102 with the screw 106. Upon the screw 106 being further rotated, the linear-downward force imparted within the dental implant assembly 100 through the screw 106 compresses the gasket 126 between the grooves 128 and 130 until the mating component 104 is coupled to the implant 102, as shown in FIG. 4B. Based on the difference in the heights $H_1$ and $H_2$, the gasket 126 deforms to the height $H_2$.

In addition, upon the mating component 104 coupling to the implant 102, the coronal ridge 402 engages the coronal groove 400. The coronal ridge 402 and the coronal groove 400 engaging creates a more tortuous path for fluid and/or microorganisms to travel to reach interior apertures of the dental implant assembly, thereby obstructing and/or preventing access to the interior apertures. Further, the coronal ridge 402 and the coronal groove 400 provide a greater surface area to seal the interface 124' between the implant 102 and the mating component 104. Moreover, as discussed above, the lateralized connection between the implant 102 and the mating component 104 provides increased stabilization against shear forces at the interface 124'.

Referring to FIG. 4C, FIG. 4C shows a detailed view of the interface 124' between the coronal groove 400 and the coronal ridge 402 of the implant 102 and the mating component 104, in accord with aspects of the present disclosure. The tolerances of forming the coronal ridge 402 and the coronal groove 400 are such that the coronal ridge 402 fully engages the coronal groove 400. Specifically, an inner surface 402a of the coronal ridge 402a engages the inner surface 400a of the coronal groove 400. Further, the outer surface 402b of the coronal ridge 402 engages the outer surface 400b of the coronal groove 400. With at least part of these surfaces engaged, the coronal groove 400 and the coronal ridge 402 are fully engaged.

According to the presence of the deformed gasket 126 and the coronal groove 400 and the coronal ridge 402, fluid and/or microorganisms are obstructed and/or prevented from accessing interior apertures of the dental implant assembly 100. The fully engaged coronal groove 400 and the coronal ridge 402 seal apertures that may otherwise exist between the implant 102 and the mating component 104 and prevent the formation of microgaps. The deformation of the gasket 126 provides an additional area to seal apertures that may still exist between the implant 102 and the mating component 104 inward from the coronal groove 400 and the coronal ridge 402.

Figure 5A:
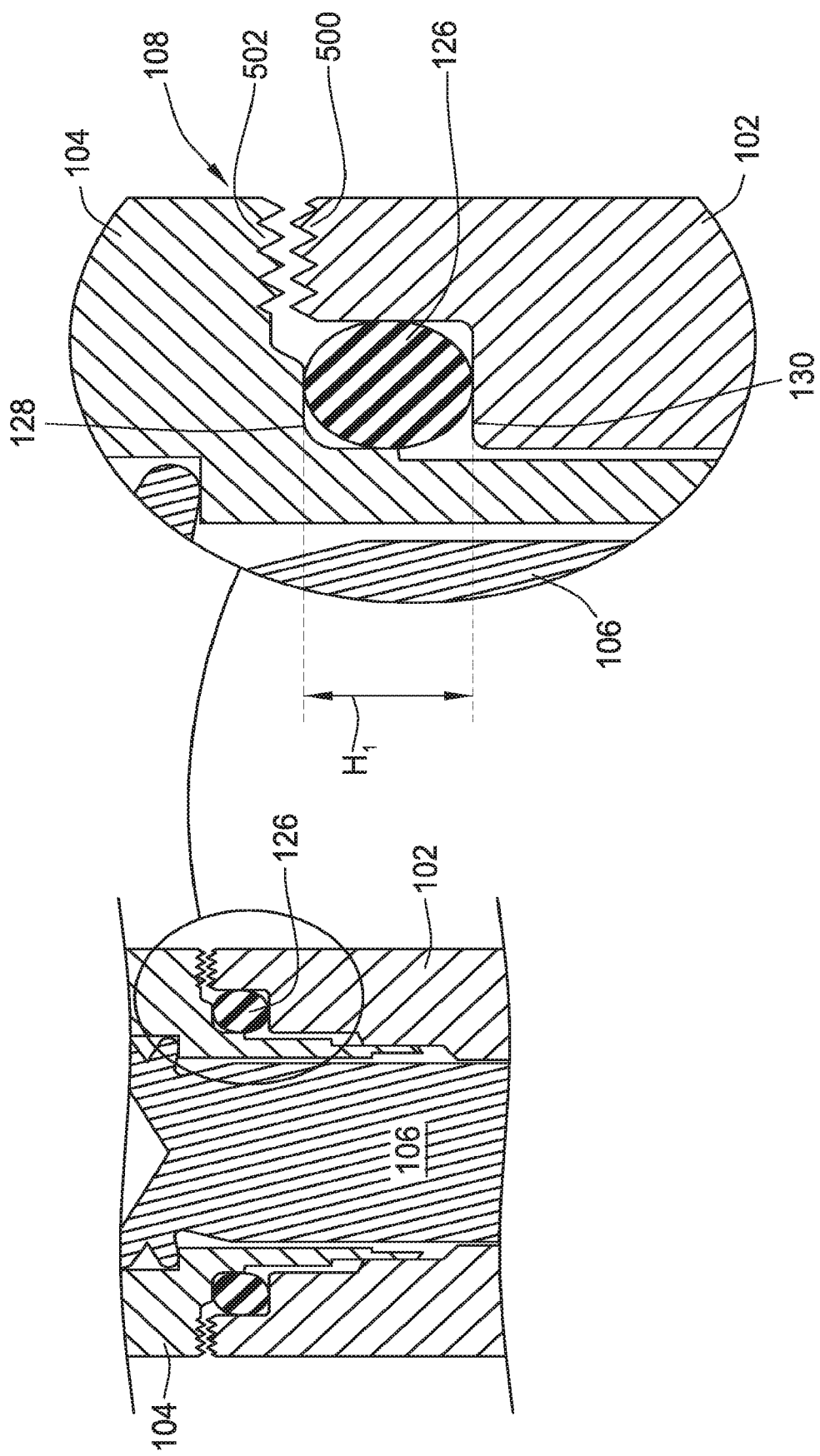
FIG. 5A shows another alternative interface between the implant and the mating component of FIGS. 1A and 1B, pre-deformation of the gasket, in accord with aspects of the present disclosure.

FIGS. 5A and 5B show a variation of the interface 124" between the implant 102 and the mating component 104 of FIGS. 1A and 1B, in addition to pre- and post-deformation of the gasket 126, in accord with aspects of the present disclosure. The implant 102 can include a castellated region 500 at the coronal end 102a. Further, the mating component 104 can include a castellated region 502 at the seating surface 108. The castellated regions 500 and 502 provide an alternative lateralized connection between the implant 102 and the mating component 104. Similar to above, the lateralized connection provides increased stabilization between the implant 102 and the mating component 104 in contrast to a non-lateralized (e.g., flat) interface between the implant 102 and the mating component 104, particularly against shear forces at the interface 124".

The castellated regions 500 and 502 can be, for example, 0.005 mm to 0.02 mm in length, with each castellation being, for example, 0.001 mm to 0.003 mm long. Although the castellated regions 500 and 502 are shown to have triangular castellations, the shape of the castellations can vary, such as being square, rectangular, circular, etc.

As discussed above, the gasket 126 can initially have a height $H_1$, which can be the dimensions discussed above, such as 1 mm. The combination of the groove 128 and the groove 130 defines a cross-section with a height $H_2$ that is less than the height $H_1$ of the gasket 126. FIG. 5A shows the initial contact between the mating component 104 and the gasket 126 upon the mating component 104 being connected to the implant 102 with the screw 106. Upon the screw 106 being further rotated, the linear-downward force imparted within the dental implant assembly 100 through the screw 106 compresses the gasket 126 between the grooves 128 and 130 until the mating component 104 is coupled to the implant 102, as shown in FIG. 5B. Based on the difference in the heights $H_1$ and $H_2$, the gasket 126 deforms to the height $H_2$.

In addition, upon the mating component 104 coupling to the implant 102, the castellated region 500 engages the castellated region 502. The castellated regions 500 and 502 engaging creates a more tortuous path for fluid and/or microorganisms to travel to reach interior apertures of the dental implant assembly, thereby obstructing and/or preventing access to the interior apertures. Further, the castellated regions 500 and 502 provide a greater surface area to seal the interface 124" between the implant 102 and the mating component 104. Because each of the castellated regions 500 and 502 include multiple castellations, one or more castellations of the castellated regions 500 and 502 can remain engaged despite the loads placed on the dental implant assembly 100. Thus, the castellated regions 500 and 502 prevent formation of microgaps between the implant 102 and the mating component 104 that provide access to fluid and/or microorganisms to the interior volumes of, for example, the implant 102.

Referring to FIG. 5C, FIG. 5C shows a detailed view of the interface 124" between the castellated regions 500 and 502 of the implant 102 and the mating component 104, in accord with aspects of the present disclosure. The castellated region 500 of the implant 102 engages and meshes with the castellated region 502 of the mating component 104 with the mating component 104 coupled to the implant 102. The meshed castellated regions 500 and 502 create a tortuous interface that obstructs or prevents fluid and/or microorganisms from accessing interior volumes of the implant 102. Thus, deformation of the gasket 126 and the engaged castellated regions 500 and 502 seal apertures that may exist between the implant 102 and the mating component 104 upon the implant 102 and the mating component 104 coupling at the interface 124".

Referring to FIGS. 6A and 6B, FIGS. 6A and 6B show a perspective view and a cross-sectional view, respectively, of the screw 106 of FIGS. 1A and 1B, in accord with aspects of the present concepts. As shown, the screw 106 includes a head 600 at a coronal end 106a, a tip 606 at an apical end 106b, and a shaft 604 between the head 600 and the tip 606.

The head 600 of the screw 106 is configured to engage the mating component 104, particularly at the shoulder 120, to secure the mating component 104 to the implant 102. The head 600 also is configured to accept a tool to apply a rotational force (e.g., torque) to the screw 106, such as to preload the screw 106 against the implant 102 and the mating component 104. As shown, the head 600 accepts a tool within a recess 602. The recess 602 can have various shapes depending on the desired tool to mate with the screw 106. For example, the recess 602 can be configured (e.g., shape, dimensions, etc.) to accept slot, Phillips, square, or hexagon drive types. Alternatively, the head 600 of the screw 106 can have another mechanical configuration, other than the recess 602, to accept a tool, such as being shaped and/or sized to accept a tool (e.g., socket wrench) over and around the head 600. The recess 602 also can be configured to accept other types of tools than ones specifically mentioned herein without departing from the spirit and scope of the present disclosure.

The shaft 604 of the screw 106 includes a non-threaded section 608 and a threaded section 610. The non-threaded section 608 is configured to engage non-threaded surfaces of the implant 102, the mating component 104, or both. The non-threaded section 608 is also referred to herein as the shank 608 of the screw 106. The threaded section 610 includes threads that engage threads of the threaded portion 114 of the bore 116 with the screw 106 inserted into the implant 102. The threads 610 engage the threaded portion 114 of the bore 116 of the implant 102 to secure the screw 106 and the mating component 104 (e.g., engaged to the screw 106) to the implant 102. The threaded section 610 is also referred to herein as simply threads 610.

The tip 606 of the screw 106 is configured to deform in response to a threshold force generated by fastening the screw 106 into the bore 116 of the implant 102. By way of example, and without limitation, the length of the screw 106 is configured with respect to the dimensions of the implant 102 and the mating component 104 (e.g., length of bore 116, position of seating surface 108) such that the tip 606 engages the apical end of the bore 116 prior to the screw 106 coupling the implant 102 to the mating component 104. The threshold force is designed to be less than the force associated with the preload of the screw 106 such that the tip 606 of the screw 106 deforms prior to coupling the mating component 104 to the implant 102.

When the tip 606 of the screw 106 deforms, the tip 606 at least partially fills the interior volume between the screw 106 and the apical end of the bore 116. Thus, the volume within the bore 116 that could otherwise be filled with fluid and/or microorganisms is filled with the deformed tip 606 of the screw 106. Deformation of the tip 606 also exerts a spring-type force on the screw 106. This spring-type force on the screw 106 decreases the preload of the screw 106.

The tip 606 of the screw 106 can be formed of the same material used to form the shaft 604 and/or the head 600. When formed of the same material, the shape and/or dimensions of the screw 106 cause the tip 606 to deform prior to the shaft 604 and/or the head 600 deforming under compressive loads applied to the screw 106. By way of example, the tip 606 of the screw 106 may have a small surface area as compared to the shaft 604 and/or the head 600 such that the same amount of force applied to a smaller area deforms the tip 606 without deforming the shaft 604 and/or the head 600.

The tip 606 of the screw 106, or a portion thereof, can be formed of a different material than, for example, the remainder of the screw 106. As shown, the tip 606 can include a recess 612 that includes a volume of material 614. The volume of material 614 can be formed of a different material than the material that forms the screw 106. The volume of material 614 can have a lower hardness than the material that forms the remainder of the screw 106 to contribute to the volume of material 614 deforming prior to a remainder of the screw 106 deforming. Alternatively, the volume of material 614 can have a lower hardness than the material that forms the remainder of the shaft 604 or the remainder of the tip 606. Accordingly, the volume of material 614 deforms under compressive forces applied between the shaft 604 and the apical end of the bore 116.

The shape of the volume of material 614 can vary depending on, for example, the shape of the recess 612 and/or the shape of the bottom of the bore 116. As shown, the volume of material 614 may be in the shape of a ball or a sphere. However, the shape of the volume of material 614 can vary without departing from the spirit and scope of the present concepts. The size of the volume of material 614 can also vary depending on, for example, the size of the recess 612 and/or the size of the bore 116. By way of example, the volume of material 614 can be the shape of a ball that is 0.5 mm to 2 mm in diameter, such as 1 mm in diameter.

Similarly, the shape of the recess 612 can vary depending on, for example, the shape of the volume of material 614 and/or the shape of the bottom of the bore 116. The shape of the recess 612 may match the initial (e.g., prior to deformation) shape of the volume of material 614. For example, if the shape of the volume of material 614 is a ball or a sphere, the shape of the recess 612 can be the shape of a half sphere. Alternatively, the shape of the recess 612 may be different than the initial shape of the volume of material 614. As shown, the recess 612 may be in the shape of a half hexagon. However, the shape of the recess 612 can vary without departing from the spirit and scope of the present disclosure.

The screw 106 can further include a lip 616 at the bottom of the head 600 that extends around the circumference of the screw 106. The lip 616 is integrated into the head 600 and engages the shoulder 120 of the mating component 104 upon inserting the screw 106 in the internal bore 118. As shown, the lip 616 generally projects from the bottom of the head at a downward angle $\theta_1$ relative to the central axis of the dental implant assembly 100. The angle $\theta_1$ may vary but, in general, can be, for example, 45 to 60 degrees off of the central axis of the dental implant assembly 100. As will be described in more detail below relative to FIGS. 7A-7F, the lip 616 acts like an integrated Belleville washer to help retain the tension in the shank 608 of the screw 106.

The screw 106 can be formed of one or more materials found within the dental arts, such as one or more metals, one or more metal alloys, and/or one or more ceramics. The screw 106 can be formed entirely of a single material, or can be formed of multiple materials. For example, each portion of the screw 106, such as the head 600, the shaft 604, and the tip 606 can be formed of one or more different materials. Alternatively, the head 600, the shaft 604, and/or the tip 606 of the screw 106 can be formed of the same one or more materials. Such materials include, for example, stainless steel, including 316L surgical-grade stainless steel, titanium, titanium alloy, gold, gold alloy, various ceramics (e.g., alumina, zirconium), and certain high-strength plastics, such as PEEK.

Referring to FIG. 6C, a cross-section of the screw 106 according to one composition of materials used to form the screw 106 of FIGS. 6A and 6B is shown, in accord with aspects of the present concepts. Specifically, FIG. 6C shows a cross-section of the screw 106 at the shank 604, but the entire screw can be formed to have the same cross-sectional structure. As shown, the screw 106 is formed of a main body 620. The body 620 forms the main, underlying portion of the head 600, the shaft 604, and at least part of the tip 606, such as the tip 606 excluding any of the volume of material 614. The body 620 can be formed of, for example, surgical-grade stainless steel, titanium, various ceramics, a gold alloy, etc.

Over the body 620 is formed a gold layer 622. The gold layer 622 can be formed of pure gold or a gold alloy. When formed of pure gold, the gold layer 622 can be, for example, 99% pure gold, 99.9% pure gold, or 99.99% pure gold. When formed of a gold alloy, the gold alloy can be formed of gold mixed with various other metals to form, for example, 14 karat gold, 18 karat gold, or 20 karat gold. The thickness of the gold layer 622 can be, for example, 40 to 70 microinches, such as 60 microinches. Among various qualities, such as durability and resistance to oxidation, the gold layer 622 enhances the lubricity of the screw 106 to allow for a larger preload on the screw 106 when coupled to the implant 102.

Over the gold layer 622 is formed a silver layer 624. The silver layer 624 can be formed of pure silver or a silver alloy. When formed of pure silver, the silver layer 624 can be, for example, 99% pure silver, 99.9% pure silver, or 99.99% pure silver. The thickness of the silver layer 624 can be, for example, 40 to 150 microinches, such as 140 microinches. Alternatively, the silver layer 624 can be formed by applying metallic silver nanoparticles to the screw 106, such as over the gold layer 622. The silver nanoparticles may generally range from about 1 nm to about 50 nm, although particles of greater sizes may be used as well. As the metallic silver nanoparticles come into contact with moisture (e.g., saliva in a patient's mouth), a chemical reaction occurs, thereby producing ionic silver ($Ag^+$), a known antimicrobial. Because the size of the silver particles is on the order of nanometers, the surface area available for the chemical reaction to occur is greater (relative to a flat surface). Thus, the number of silver ions produced is increased, thereby enhancing the antimicrobial effect. The presence of the silver nanoparticles may inhibit or prevent the growth and/or spread of bacteria and/or microbes in and/or around the dental implant assembly 100.

The silver layer 624 can be applied using any suitable technique. For example, a coating of silver nanoparticles may be applied to the screw 106 using techniques including, but not limited to plasma-sputtering or plasma-spraying. It is also contemplated that discrete nanoparticles of silver may be discontinuously deposited onto the surface of any of the components of the dental implant assembly 100.

Having the silver layer 624 as the outermost layer of the screw 106 provides a deformable surface relative to other surfaces of, for example, the implant 102 and the mating component 104. Accordingly, and as discussed in further detail below, the silver layer 624 at various interfaces with other surfaces within the dental implant assembly 100 deforms to seal inner apertures that might otherwise exist between the other surfaces and the surface of the screw 106 without the silver layer 624. The deformable nature of the silver layer 624 also may create a bonding effect through freezing in place or a spring-type force that prevents the screw 106 from loosening. Further, the silver layer 624 can enhance the lubricity of the screw 106 to allow for a larger preload on the screw 106 when coupled to the implant 102.

Although described as the entire screw 106 being formed of the body 620, the gold layer 622, and the silver layer 624, other configurations are possible without departing from the spirit and scope of the present disclosure. For example, one or both of the head 600 and the tip 606 may be formed of the body 620 that excludes the gold layer 622 and/or the silver layer 624. Alternatively, only the head 600 may be formed of the body 620 without the gold layer 622 and the silver layer 624. Alternatively, the screw 106 can be formed of the body 620 with only the gold layer 622 or only the silver layer 624. Alternatively, the entire screw 106 can be formed of gold, a gold alloy, silver, or a silver alloy.

Figure 7A:
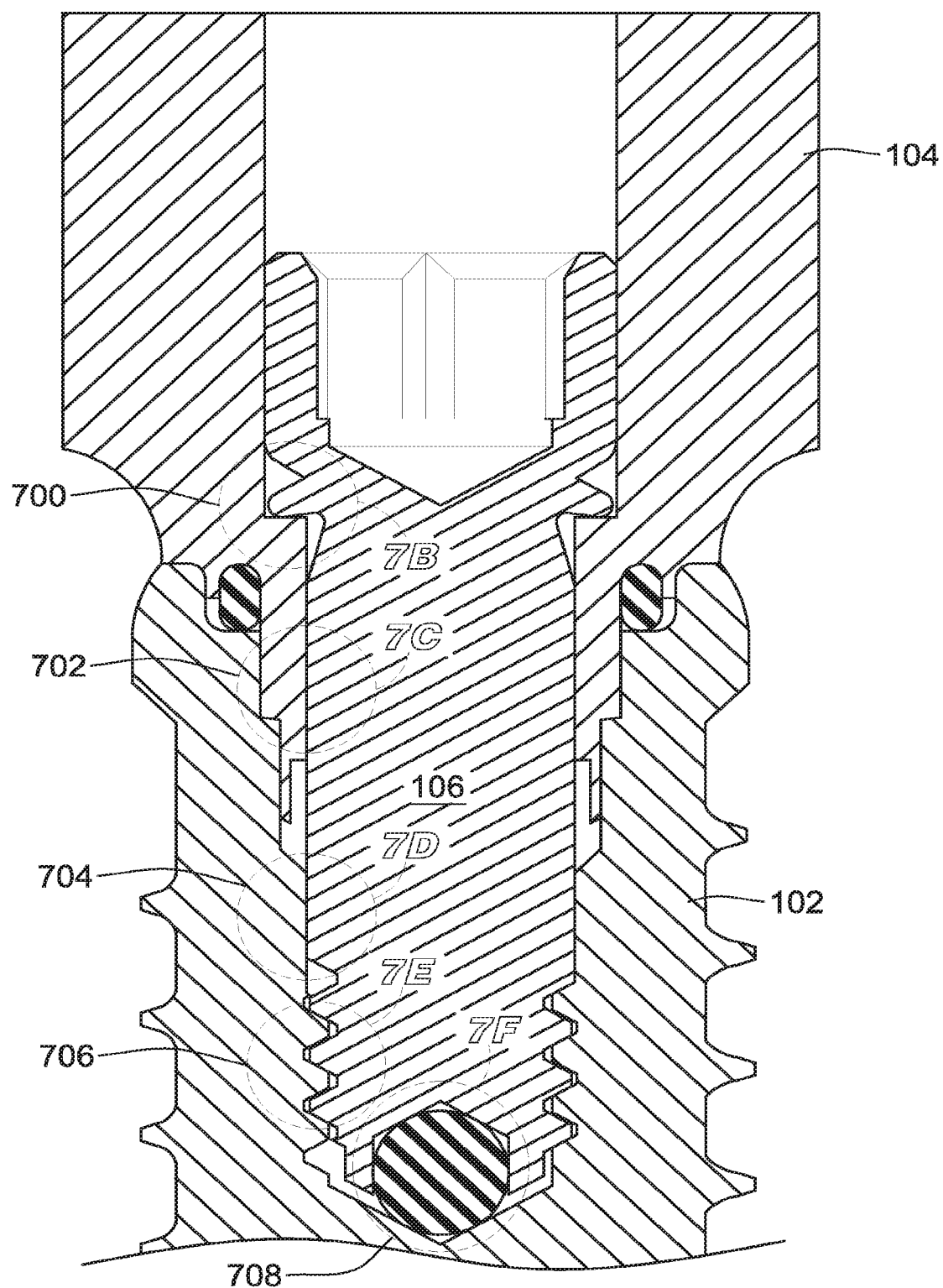
FIG. 7A shows a partial cross-sectional view of the implant, the mating component, the screw, and the gasket of FIGS. 1A and 1B, in accord with aspects of the present disclosure.

FIG. 7A shows a partial cross-sectional view of the implant 102, the mating component 104, the screw 106, and the gasket 126 of FIGS. 1A and 1B, in accord with aspects of the present disclosure. The screw 106, as described above with the silver layer 624, creates one or more interfaces between one or more of the implant 102 and the mating component 104 upon coupling the implant 102 and the mating component 104 together in the dental implant assembly 100. Specifically, FIG. 7A shows various interfaces 700, 702, 704, 706, and 708, and FIGS. 7B-7F show detailed views of the five interfaces 700, 702, 704, 706, and 708 between the screw 106 and other components of the dental implant assembly 100. Specifically, FIG. 7A shows the screw 106 with the head 600, the shaft 604, and the tip 606 with the outermost layer of the silver layer 624, including the volume of material 614. The five interfaces 700, 702, 704, 706, and 708 are all possible locations where the screw 106 interfaces with another component of the dental implant assembly 100 to create a seal that prevents fluid and/or microorganisms from accessing further into the dental implant assembly 100.

Figure 7B:
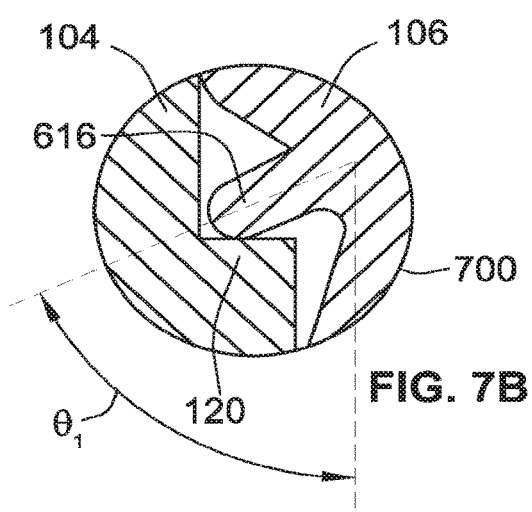
FIG. 7B shows a detailed cross-sectional view of an interface between the screw and the mating component of FIG. 7A, in accord with aspects of the present disclosure.

FIG. 7B shows a partial cross-sectional view of the interface 700 between the screw 106 and the mating component 104, in accord with aspects of the present disclosure.

The lip 616 of the screw 106 engages the shoulder 120 of the mating component 104 upon the screw 106 being inserted into the internal bore 118 of the mating component 104. Upon rotating the screw 106 and engaging the threads 610 of the screw 106 with the threads of the bore 116, the torque on the head 600 of the screw 106 creates a linear-downward force on the lip 616 against the shoulder 120. The linear-downward force causes the silver layer 624 on the lip 616 to create a seal against the shoulder 120.

As described above, the lip 616 can have the silver layer 624 as an outer layer. Alternatively, the entire lip 616 can be formed of silver or a silver alloy. Based on the hardness of the silver or a silver alloy, a specific threshold of linear-downward force causes the silver layer 624 to deform relative to the other components of the screw 106, which enhances the seal formed at the interface 700. Specifically, the silver and/or silver alloy of the lip 616 fills apertures between the mating component 104 and the screw 106 at the shoulder 120. Deformation of the lip 616 also can create a spring-type force that increases the preload of the screw 106 coupled to the implant 102. As such, the lip 616 acts like an integrated Belleville washer for the screw 106 to help increase tension in the screw 106 as it is being deflected and/or deformed. Alternatively, the head 600 of the screw 106 may not include the lip 616. Instead, an underside of the head 600 that contacts that shoulder 120 of the mating component 104 can include the silver layer 624, rather than the silver layer 624 being on the lip 616.

Figure 7C:
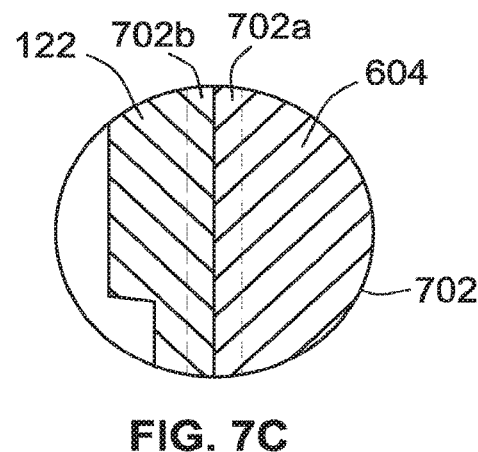
FIG. 7C shows a detailed cross-sectional view of another interface between the screw and the mating component of FIG. 7A, in accord with aspects of the present disclosure.
Figure 7D:
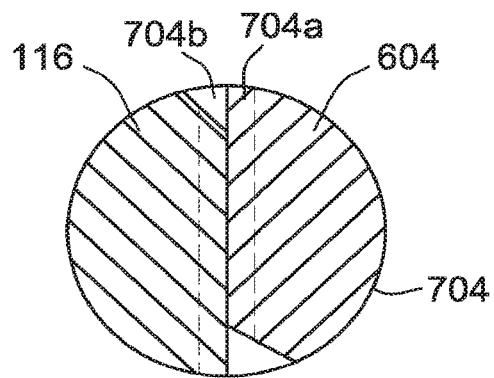
FIG. 7D shows a detailed cross-sectional view of an interface between the screw and the implant of FIG. 7A, in accord with aspects of the present disclosure.
Figure 7E:
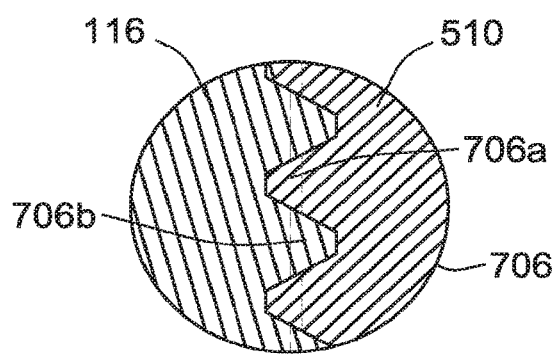
FIG. 7E shows a detailed cross-sectional view of another interface between the screw and the implant of FIG. 7A, in accord with aspects of the present disclosure.
Figure 7F:
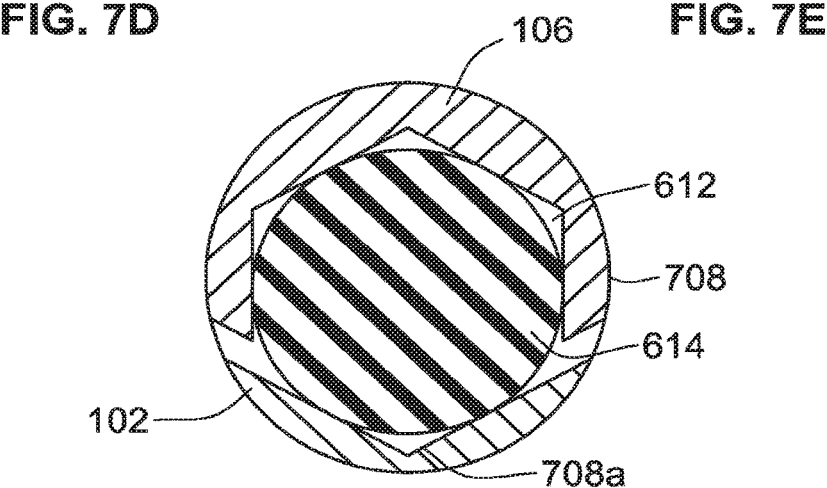
FIG. 7F shows a detailed cross-sectional view of another interface between the tip of the screw and the implant of FIG. 7A, in accord with aspects of the present disclosure.
Figure 7G:
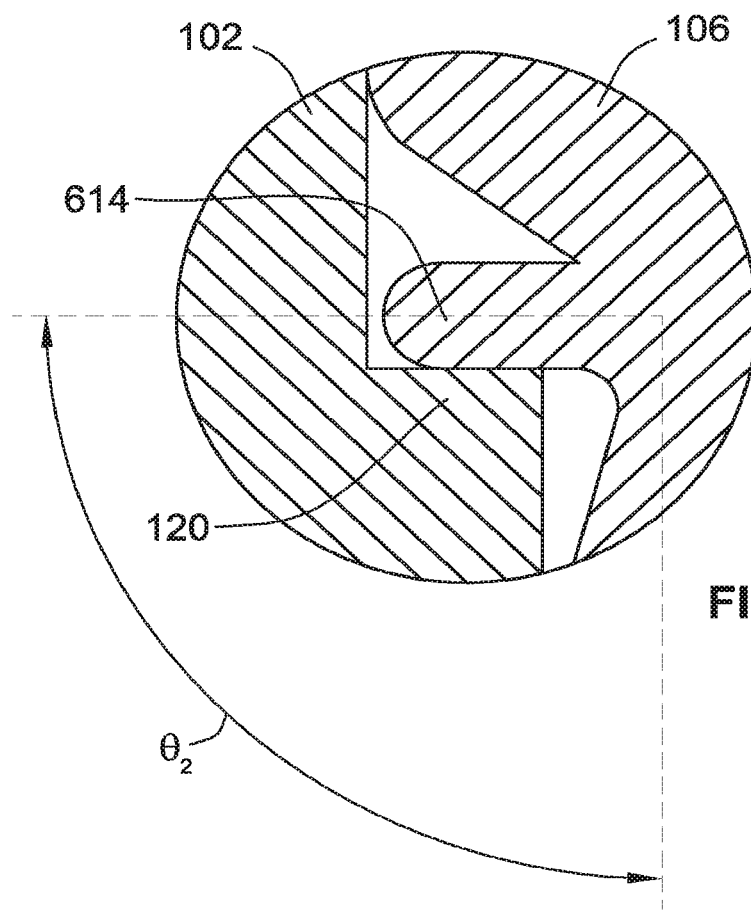
FIG. 7G shows a detailed cross-sectional view of the interface between the screw and the mating component of FIG. 7A, in accord with aspects of the present disclosure.

Specifically, FIG. 7G shows an example of the entire lip 616 being formed of silver or a silver alloy and the lip 616 being deformed upon coupling the mating component 104 to the implant 102. According to such a configuration, the entire lip 616 can deform in response to a linear-downward force resulting from rotation of the screw 106. Similar to the gasket 126, the lip 616 formed entirely of silver or a silver alloy deforms under the compressive loads generated by coupling the mating component 104 to the implant 102 using the screw 106. The configuration (e.g., dimensions) of the implant 102, the mating component 104, the screw 106, and the lip 616 is such that a compressive force is applied to the lip 616 prior to the implant 102 or the mating component 104 obstructing the screw 106 from translating farther into the bore 116. Accordingly, additional rotational force on the screw 106 is converted into a linear-downward force. Deformation of the lip 616 causes the lip 616 to fill voids and/or microscopic apertures between the screw 106 and the mating component 104 at the interface 700. Further, as shown, the angle $\theta_2$ of the lip 616 relative to the central axis of the dental implant assembly 100 is increased from the initial 45 to 60 degrees relative to the central axis to, for example, 60 to 90 degrees, or beyond, relative to the central axis.

FIG. 7C shows a detailed view of the interface 702 between the screw 106 and the mating component 104, in accord with aspects of the present disclosure. Specifically, FIG. 7C shows the interface 702 between the shaft 604 of the screw 106 and the insert portion 122 of the mating component 104. An area 702a of the outer surface of the shaft 604 of the screw 106 is formed to be slightly larger (e.g., in diameter) than an area 702b of the inner surface of the insert portion 122 at the interface 702. Accordingly, upon the screw 106 being inserted through the internal bore 118 of the mating component 104 and threaded into engagement with the bore 116 of the implant 102, the areas 702a and 702b engage and create a seal between the shaft 604 and the insert portion 122.

As described above, the shaft 604 includes the silver layer 624 as an outer layer. Based on the hardness of the silver layer 624, a specific threshold of linear-downward force causes the silver layer 624 to deform relative to the surface of the insert portion 122, which further creates a seal by the silver layer 624 filling voids and/or apertures at the insert portion 122. Deformation of the silver layer 624 at the insert portion 122 seals and/or prevents the formation of a microgap that could allow fluid and/or microorganisms to enter into an aperture between the screw 106 and the mating component 104 beyond the interface 702.

FIG. 7D shows a detailed view of an interface 704 between the screw 106 and the implant 102, in accord with aspects of the present disclosure. Specifically, FIG. 7D shows the interface 704 between the shaft 604 of the screw 106 and the bore 116 of the implant 102. An area 704a of the outer surface of the shaft 604 of the screw 106 is formed to be larger (e.g., in diameter) than an area 704b of the inner surface of the bore 116 at the interface 704. Accordingly, upon the screw 106 being inserted into the bore 116 and threaded into engagement, the areas 704a and 704b engage and create a seal between the shaft 604 and the bore 116.

As described above, the shaft 604 can have the silver layer 624 as an outer layer. Based on the hardness of the silver layer 624, a specific threshold of linear-downward force causes the silver layer 624 to deform relative to the surface of the bore 116, which further creates a seal by the silver layer 624 filling voids and/or apertures at the inner surface of the bore 116. Deformation of the silver layer 624 at the inner surface of the bore 116 seals and/or prevents the formation of a microgap that could allow fluid and/or microorganisms to enter into an aperture between the screw 106 and the implant 102 beyond the interface 704.

FIG. 7E shows a detailed view of an interface 706 between the screw 106 and the implant 102, in accord with aspects of the present disclosure. Specifically, FIG. 7E shows the interface 706 between the threads 610 of the screw 106 and the threads of the bore 116 of the implant 102. An area 706a of the outer surface of the threads 610 of the screw 106 is formed to be larger than an area 706b of the inner surface of the threads of the bore 116 at the interface 706. Accordingly, upon the screw 106 being inserted into the bore 116 and the threads 610 of the screw 106 being threaded into engagement with the threads of the bore 116, the areas 706a and 706b engage and create a seal between the threads 610 and the threads of the bore 116.

With the silver layer 624 as an outer layer on the screw, and based on the hardness of the silver layer 624, a specific threshold of linear-downward force causes the silver layer 624 to deform relative to the threads of the bore 116, which further creates a seal by the silver layer 624 filling voids and/or apertures between the threads 610 and the bore 116. Deformation of the silver layer 624 seals and/or prevents the formation of a microgap that could allow fluid and/or microorganisms to enter into an aperture between the screw 106 and the implant 102 beyond the interface 706.

FIG. 7F shows a detailed view of an interface 708 between the tip 606 of the screw 106 and the implant 102, in accord with aspects of the present disclosure. Specifically, FIG. 7F shows the interface 708 between interior volume 708a of the bore 116 and the tip 606 (e.g., particularly the volume of material 614) of the screw 106. Initially, as shown in FIG. 7F, the volume of material 614 takes its original shape, such as a recessed ball or sphere, and does not fill the interior volume 708a. Upon the compressive load being applied to the volume of material 614 through rotation of the screw 106 causing a compressive force between the volume of material 614 and the bore 116, the volume of material 614 deforms. The force required to deform the volume of material 614 is configured to be, for example, less than a threshold force that would deform other components of the dental implant assembly 100, such as the remainder of the screw 106.

Figure 7H:
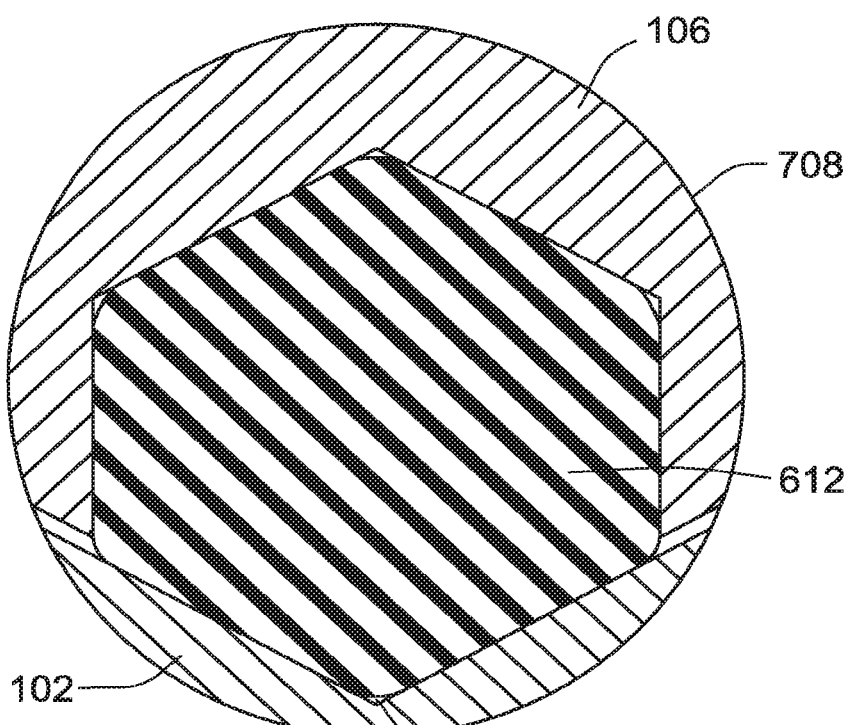
FIG. 7H shows a detailed cross-sectional view of the volume of material in FIG. 7F in a deformed state, in accord with aspects of the present disclosure.

FIG. 7H shows a detailed view of the volume of material 614 in a deformed state, in accord with aspects of the present disclosure. As shown, the volume of material 614 fills the interior volume 708a to leave an interior volume 708b between the screw 106 and the apical end of the bore 116 more than prior to deformation of the volume of material 614. Although shown as some interior volume 708b remaining, the volume of material 614 may entirely fill the interior volume 708a between the volume of material 614 and the bore 116. The difference between the interior volume 708a and the interior volume 708b within the bore 116 that could otherwise be filled with fluid and/or microorganisms is filled with the deformed tip 606 (e.g., volume of material 614) of the screw 106. Moreover, with the volume of material 614 being formed of silver or a silver alloy, the antimicrobial properties of the silver reduce and/or prevent issues (e.g., malodor) from microbial-containing fluid and/or microorganisms that access the bottom of the bore 116 of the implant 102.

The above disclosure describes multiple interfaces that limit, prevent, and/or seal microgaps that may form between components of the dental implant assembly 100. While the various interfaces are all shown and described above together with respect to the dental implant assembly 100, such disclosure is merely for convenience. One or more of the above-described interfaces and/or components are not required such that one or more of the interfaces and/or components may be omitted from a dental implant assembly without departing from the spirit and scope of the present disclosure. By way of example, and without limitation, a dental implant assembly may include only the gasket 126, only the screw 106 with the silver layer 624, only the screw 106 with the lip 616, etc., while still providing the ability to seal, limit, and/or prevent the formation of microgaps and fluid and/or microorganisms from accessing interior volumes of a dental implant assembly.

Although the antimicrobial aspects of silver are primarily described above with respect to the gasket 126 being formed of silver or a silver alloy, all components described herein that can be formed of silver or a silver alloy exhibit the same antimicrobial properties based on the antimicrobial properties associated with silver. Thus, in addition to the mechanical properties that the various components and interfaces being formed or covered with silver possess, the various components and interfaces further possess the chemical and antimicrobial properties associated with silver, particularly silver ions.

As described above, it is contemplated that the mating component 104 and that gasket 126 can be affixed to form a single component, or may come as two separate components of a kit. In each case, the mating component 104 and the gasket 126 can be configured based on, for example, shape and dimensions to couple to existing implants of existing dental implant assemblies. Accordingly, the implant 102 described above can be a conventional implant of an existing dental implant assembly, and the mating component 104 and the gasket 126 can be configured to couple to the existing implant 102. In addition, the mating component 104 and the gasket 126 also can be configured, as needed, to account for existing screws of dental implant assemblies.

Figure 8:
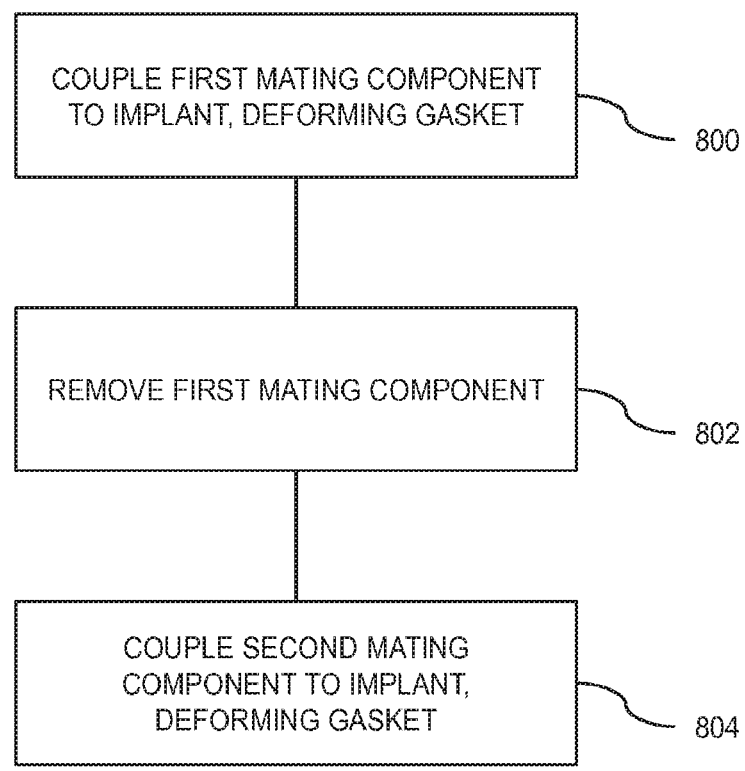
FIG. 8 shows a flow diagram detailing a method of coupling multiple mating components to an implant, and sequentially deforming gasket, in accord with aspects of the present disclosure.

Referring to FIG. 8, a general method of coupling multiple mating components to an implant, and sequentially deforming a gasket, is disclosed, in accord with aspects of the present concepts. At step 800, a first mating component, of at least two mating components, is coupled to the implant 102. The first mating component can be, for example, a first mating component used in a sequence of mating components within a protocol of replacing a tooth with a prosthetic tooth. By way of example, and without limitation, the first mating component can be a healing abutment. Coupling the first mating component to the implant causes a gasket (e.g., gasket 126) between the first mating component and the implant to deform a first deformation amount. The gasket can deform based on the gasket being formed of silver, such as pure silver or a silver alloy. As described above, the gasket seals an interface between the first mating component and the implant 102. Coupling, as described herein and with respect to step 800, refers to the first mating component being fully engaged with the implant 102, such as the screw (e.g., screw 106) used to couple the first mating component to the implant 102 being set to a desired preload to secure the first mating component to the implant 102.

At step 802, the first mating component is removed from the implant 102. As described above, the gasket 126 can be a separate component of the dental implant assembly 100. Accordingly, removal of the first mating component can leave the gasket remaining on the implant 102. Additionally, the gasket may be affixed to the implant 102 to further contribute and/or aid the gasket remaining with the implant 102 upon removing the first mating component. Moreover, based on the materials that the gasket is formed of, such as silver or a silver alloy, the gasket remains deformed after removal of the first mating component.

At step 804, a second mating component, of the at least two mating components, is coupled to the implant 102. The second mating component can be, for example, a second mating component used in a sequence of mating components within a protocol of replacing a tooth with a prosthetic tooth. By way of example, and without limitation, the second mating component can be a temporary or a permanent abutment. Coupling the second mating component to the implant causes the gasket (e.g., gasket 126) between the second mating component and the implant 102 to deform a second deformation amount. The second deformation amount is an amount of deformation, in addition to the first deformation amount. Because coupling the second mating component to the implant 102 causes the gasket to deform a second deformation amount, the gasket seals an interface between the second mating component and the implant 102. Thus, the gasket takes on the shape of, for example, the seating surface of the second mating component despite having the first mating component coupled to the implant.

Steps 802 and 804 can be repeated with additional mating components, as needed, such as third and fourth mating components. With the coupling of each subsequent mating component, the gasket is further deformed. The successive deformation of the gasket with each subsequent mating component aids in sealing the interface between the specific mating component and the implant, rather than the gasket remaining deformed and shaped based on the previous mating component. However, not all components that attach to the implant need to deform the gasket. For example, analogs, implant mounts, and impression copings, to list a few types of such components, can be used within the dental implant assembly and can connect to the implant without deforming the gasket.

The first and second mating components can be configured according to their shape and/or their dimensions to deform the gasket despite a previous mating component deforming the gasket. Various configurations of the mating components can cause the cumulative deformation of the gasket. By way of example, and without limitation, the first mating component can include a first groove, such as the groove 128. The first groove engages the gasket with the first mating component coupled to the implant, causing the gasket to deform the first deformation amount. The second mating component can include a second groove. The second groove engages the gasket with the second mating component coupled to the implant. With other dimensions and shapes that same, the second groove can be shallower than the first groove causing the gasket to deform further the second deformation amount relative to the first deformation amount. Thus, with the addition of each subsequent mating component, such as the healing abutment, the temporary abutment, and the permanent abutment, the gasket can sequentially be deformed to maintain a seal between the mating components and the implant, as described above, to obstruct and/or prevent fluid and/or microorganisms from entering interior volumes of the implant 102.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims. For example, the present invention contemplates kits having the inserts and prosthetic portions of the same general configuration, but different sizes to accommodate differently sized implants.

What is claimed is:

1. A dental implant assembly comprising:
   an implant having a bore and a first groove within a coronal end;
   a mating component configured to couple to the implant at the coronal end of the implant, the mating component having a seating surface including a second groove, wherein the seating surface is configured to contact the coronal end of the implant when the mating component is coupled to the implant;
   a screw configured to secure the mating component to the implant, wherein an apical tip positioned on a centrally located longitudinal axis of the screw is configured to deform against a base at an apical end of the bore of the implant in response to a threshold torque applied to the screw to secure the mating component to the implant, wherein the apical tip is formed by a volume of metal received in a recess of the screw; and
   a gasket configured to sit wholly within the first groove in the coronal end of the implant and the second groove in the seating surface of the mating component when the mating component is coupled to the implant, the gasket configured to deform, under a clamping force generated by coupling the mating component to the implant using the screw, and seal an interface between the coronal end of the implant and the seating surface of the mating component, wherein the gasket is formed of a metal.

2. The dental implant assembly of claim 1, wherein the interface is around the bore.

3. The dental implant assembly of claim 1, wherein the metal of the gasket includes silver.

4. The dental implant assembly of claim 1, wherein the gasket is affixed to the mating component such that the gasket and the mating component are a single integral unit.

5. The dental implant assembly of claim 1, wherein the volume of metal of the apical tip includes silver.

6. The dental implant assembly of claim 1, wherein the screw is formed of the apical tip and a screw body, a gold coating over the screw body, and a silver coating over the gold coating.

7. The dental implant assembly of claim 1, wherein the implant includes a castellated region on the first coronal end positioned lateral of the first groove in the implant, the mating component includes a castellated region on the seating surface positioned lateral of the second groove in the mating component, and the castellated region of the implant meshes with the castellated region of the mating component with the mating component secured to the implant, and wherein at least one pair of implant castellation and mating component castellation are fully engaged with the abutment secured to the implant.

8. The dental implant assembly of claim 1, wherein the mating component has a ridge in the seating surface, and the ridge is fully engaged with the first groove of the implant when the mating component is mated with the implant.

9. The dental implant assembly of claim 1, the implant having a ridge within the first coronal end, the mating component having a third groove in the seating surface, and the ridge is fully engaged with the third groove with the mating component mated with the implant.

10. A dental implant assembly comprising:
    an implant having a coronal surface and an internal bore defining a first groove;
    a mating component including an insert portion, a seating surface, and a mating component groove, the insert portion being configured to be inserted at least partially within the internal bore;
    a screw insertable into the internal bore and configured to secure the mating component to the implant, wherein an apical tip is positioned at an apical end of a shaft and on a longitudinal axis of the screw, wherein the apical tip is configured to deform against a base at an apical end of the bore of the implant in response to the screw securing the mating component to the implant, wherein the apical tip is formed by a volume of metal received in a recess of the screw; and
    a gasket configured to non-elastically deform and be seated wholly within the first groove and the mating component groove when the coronal surface of the implant contacts the seating surface of the mating component, wherein the gasket is formed of a metal.

11. The dental implant assembly of claim 10, wherein the screw includes:
    a head and the shaft extending from the head, wherein the head includes a lip at an apical end of the head and extending around a circumference of the head, wherein the lip is configured to deform in response to the screw securing the mating component to the implant.

12. The dental implant assembly of claim 11, wherein the lip is formed from silver, and wherein the volume of metal of the apical tip includes silver.

13. The dental implant assembly of claim 1, wherein a portion of the apical tip extends beyond an apical end of a threaded portion of the dental implant.

14. A dental implant assembly comprising:
    an implant having a bore and a groove within a coronal end;
    a mating component configured to couple to the implant at the coronal end of the implant, the mating component having a seating surface including a groove, wherein the seating surface is configured to engage the coronal end of the implant when the mating component is coupled to the implant;

a screw configured to secure the mating component to the implant, wherein an apical tip positioned on a centrally located longitudinal axis of the screw is configured to deform against a base at an apical end of the bore of the implant in response to a threshold torque applied to the screw to secure the mating component to the implant, wherein the apical tip is formed by a volume of metal received in a recess of the screw; and a gasket, formed of metal, the gasket configured to sit wholly within the groove in the coronal end of the implant and the groove in the seating surface of the mating component when the mating component is coupled to the implant, the gasket configured to deform, under a clamping force generated by coupling the mating component to the implant using the screw, and seal an interface between the coronal end of the implant and the seating surface of the mating component.

15. The dental implant assembly according to claim 14, wherein the interface is around the bore.

16. The dental implant assembly according to claim 14, wherein at least one of the metal of the gasket and the volume of metal of the apical tip includes silver.

17. The dental implant assembly according to claim 14, wherein the gasket is affixed to the mating component.

18. The dental implant assembly according to claim 14, wherein the bore of the implant extends into the coronal end of the implant, and wherein the mating component includes an insert portion, the insert portion being configured to be inserted at least partially within the bore.

19. The dental implant assembly according to claim 18, wherein the gasket is configured to deform a first deformation amount in response to a second threshold torque applied to secure the mating component to the implant, wherein the dental implant assembly is part of a dental implant system including a second mating component including a second insert portion and a second mating component groove, the second insert portion being configured to be inserted at least partially within the bore when the second mating component is mated with the implant, wherein the gasket is configured to deform a second deformation amount in response to a threshold torque applied to secure the second mating component to the implant, and wherein the second deformation amount is greater than the first deformation amount.

* * * * *